(12) United States Patent
Wood

(10) Patent No.: US 7,740,303 B2
(45) Date of Patent: Jun. 22, 2010

(54) MINI SKIRT AERODYNAMIC FAIRING DEVICE FOR REDUCING THE AERODYNAMIC DRAG OF GROUND VEHICLES

(76) Inventor: Richard Wood, 754 Suffolk La., Virginia Beach, VA (US) 23452

( * ) Notice: Subject to any disclaimer, the term of this patent is extended or adjusted under 35 U.S.C. 154(b) by 0 days.

(21) Appl. No.: 12/319,726

(22) Filed: Jan. 12, 2009

(65) Prior Publication Data

US 2009/0195017 A1    Aug. 6, 2009

Related U.S. Application Data

(63) Continuation-in-part of application No. 11/811,541, filed on Jun. 11, 2007, now Pat. No. 7,497,502.

(60) Provisional application No. 60/814,303, filed on Jun. 19, 2006.

(51) Int. Cl.
    *B60J 7/00* (2006.01)
(52) U.S. Cl. .................................. 296/180.4; 296/180.1
(58) Field of Classification Search ............. 296/180.1, 296/180.2, 180.3, 180.4, 180.5
    See application file for complete search history.

(56) References Cited

U.S. PATENT DOCUMENTS

| | | | |
|---|---|---|---|
| 2,569,983 A | 10/1951 | Favre | |
| 2,605,119 A | 7/1952 | Maxwell | |
| 2,737,411 A | 3/1956 | Potter | |
| 3,010,754 A | 11/1961 | Schumaker | |
| 3,348,873 A | 10/1967 | Kerrigan | |
| 3,415,566 A | 12/1968 | Kerrigan | |
| 3,697,120 A | 10/1972 | Saunders | |
| 3,834,572 A | 9/1974 | Eskenazi | |
| 3,854,769 A | 12/1974 | Saunders | |
| 3,866,967 A | 2/1975 | Landry et al. | |
| 3,934,922 A | 1/1976 | MacCready, Jr. et al. | |
| 3,945,677 A | 3/1976 | Servals et al. | |
| 3,960,402 A | 6/1976 | Keck | |
| 3,971,586 A | 7/1976 | Saunders | |
| 3,999,797 A | 12/1976 | Kirsch et al. | |
| 4,006,932 A | 2/1977 | McDonald | |
| 4,021,069 A | 5/1977 | Hersh | |
| 4,030,779 A | 6/1977 | Johnson | |
| 4,035,013 A | 7/1977 | Abbott, III | |
| 4,068,883 A | 1/1978 | Meinecke et al. | |
| 4,113,299 A | 9/1978 | Johnson et al. | |
| 4,131,309 A | 12/1978 | Henke | |
| 4,142,755 A | 3/1979 | Keedy | |

(Continued)

FOREIGN PATENT DOCUMENTS

DE        3115742 A1    11/1982

(Continued)

*Primary Examiner*—Joseph D Pape
(74) *Attorney, Agent, or Firm*—Williams Mullen; M. Bruce Harper

(57) ABSTRACT

A device for the reduction of aerodynamic drag and for improved performance and stability of ground vehicles by reducing the mass and velocity of the flow passing under a vehicle is described. The device is particularly suited for a tractor-trailer truck system that includes a motorized lead vehicle pulling one or more non-motorized vehicles. The device is designed to control the flow from entering the undercarriage region from the side of a trailer of a tractor-trailer truck system.

48 Claims, 28 Drawing Sheets

U.S. PATENT DOCUMENTS

| | | |
|---|---|---|
| 4,170,378 A | 10/1979 | Jacobsen |
| 4,210,354 A | 7/1980 | Canning |
| 4,214,787 A | 7/1980 | Chain |
| 4,257,640 A | 3/1981 | Wiley |
| 4,257,641 A | 3/1981 | Keedy |
| 4,269,444 A | 5/1981 | Emory |
| 4,284,302 A | 8/1981 | Drews |
| 4,310,192 A | 1/1982 | Fitzgerald |
| 4,316,630 A | 2/1982 | Evans |
| 4,318,566 A | 3/1982 | Fitzjarrell |
| 4,320,920 A | 3/1982 | Goudey |
| 4,343,506 A | 8/1982 | Seltzman |
| 4,386,801 A | 6/1983 | Chapman et al. |
| 4,401,338 A | 8/1983 | Caldwell |
| 4,433,865 A | 2/1984 | Crompton, Jr. |
| 4,451,074 A | 5/1984 | Scanlon |
| 4,455,045 A | 6/1984 | Wheeler |
| 4,458,936 A | 7/1984 | Mulholland |
| 4,468,060 A | 8/1984 | Fitzgerald et al. |
| 4,486,046 A | 12/1984 | Whitney et al. |
| 4,508,380 A | 4/1985 | Sankrithl |
| 4,553,781 A | 11/1985 | Johnson |
| 4,601,508 A | 7/1986 | Kerian |
| 4,611,847 A | 9/1986 | Sullivan |
| 4,640,541 A | 2/1987 | Fitzgerald et al. |
| 4,682,808 A | 7/1987 | Bilanin |
| 4,688,841 A | 8/1987 | Moore |
| 4,702,509 A | 10/1987 | Elliott, Sr |
| 4,706,910 A | 11/1987 | Walsh et al. |
| 4,741,569 A | 5/1988 | Sulphen |
| 4,746,160 A | 5/1988 | Wiesemeyer |
| 4,756,256 A | 7/1988 | Rains et al. |
| 4,789,117 A | 12/1988 | Peterson et al. |
| 4,813,635 A | 3/1989 | Peterson et al. |
| 4,818,015 A | 4/1989 | Scalon |
| 4,830,315 A | 5/1989 | Presz et al. |
| 4,867,397 A | 9/1989 | Pamadi et al. |
| 4,978,162 A | 12/1990 | Labbe |
| D317,425 S | 6/1991 | Vysotsky et al. |
| 5,058,837 A | 10/1991 | Wheeler |
| 5,058,945 A | 10/1991 | Elliott et al. |
| 5,236,347 A | 8/1993 | Andrus |
| 5,240,306 A | 8/1993 | Flemming |
| 5,277,444 A | 1/1994 | Stropkay |
| 5,280,990 A | 1/1994 | Rinard |
| 5,322,340 A | 6/1994 | Sato et al. |
| 5,332,280 A | 7/1994 | DuPont et al. |
| 5,348,366 A | 9/1994 | Baker et al. |
| 5,374,013 A | 12/1994 | Bassett et al. |
| 5,375,903 A | 12/1994 | Lechner |
| D354,726 S | 1/1995 | Fitzgerald et al. |
| 5,487,586 A | 1/1996 | Kinkaide |
| 5,498,059 A | 3/1996 | Switlik |
| 5,513,893 A | 5/1996 | Nakata et al. |
| 5,536,062 A | 7/1996 | Spears |
| 5,609,384 A | 3/1997 | Loewen |
| 5,658,038 A | 8/1997 | Griffin |
| 5,685,597 A | 11/1997 | Reid |
| 5,791,724 A | 8/1998 | Wesley |
| 5,823,610 A | 10/1998 | Ryan et al. |
| 5,887,280 A | 3/1999 | Waring |
| 5,908,217 A | 6/1999 | Englar |
| 5,921,617 A | 7/1999 | Loewen |
| 5,947,548 A | 9/1999 | Carper et al. |
| D415,085 S | 10/1999 | Fitzgerald |
| 6,092,861 A | 7/2000 | Whelan |
| 6,131,853 A | 10/2000 | Bauer et al. |
| 6,257,654 B1 | 7/2001 | Boivin |
| 6,276,636 B1 | 8/2001 | Krestel |
| 6,286,892 B1 | 9/2001 | Bauer et al. |
| 6,286,894 B1 | 9/2001 | Kingham |
| 6,309,010 B1 | 10/2001 | Whitten |
| 6,409,194 B1 | 6/2002 | Voas |
| 6,409,252 B1 | 6/2002 | Andrus |
| 6,412,853 B1 | 7/2002 | Richardson |
| 6,428,084 B1 | 8/2002 | Liss |
| 6,457,766 B1 | 10/2002 | Telnack |
| 6,467,833 B1 | 10/2002 | Travers |
| 6,485,087 B1 | 11/2002 | Roberge et al. |
| 6,502,383 B1 | 1/2003 | Janarden et al. |
| 6,595,578 B1 | 7/2003 | Calsoyds et al. |
| 6,616,218 B2 | 9/2003 | Bauer et al. |
| 6,634,700 B1 | 10/2003 | Clavert |
| 6,644,720 B2 | 11/2003 | Long et al. |
| 6,666,498 B1 | 12/2003 | Whitten |
| 6,702,364 B2 | 3/2004 | Neel |
| 6,742,616 B2 | 6/2004 | Leban |
| 6,789,839 B1 | 9/2004 | Samuelson |
| 6,799,791 B2 | 10/2004 | Reiman et al. |
| 6,854,788 B1 | 2/2005 | Graham |
| 6,877,793 B2 | 4/2005 | Cory |
| 6,886,882 B2 | 5/2005 | Farlow et al. |
| 6,899,369 B2 | 5/2005 | Neel |
| 6,959,958 B2 | 11/2005 | Basford |
| 6,974,178 B2 | 12/2005 | Ortega et al. |
| 6,979,049 B2 | 12/2005 | Ortega et al. |
| 7,008,004 B2 | 3/2006 | Ortega et al. |
| 7,008,005 B1 | 3/2006 | Graham |
| 7,073,845 B2 | 7/2006 | Ortega et al. |
| 7,093,889 B2 | 8/2006 | Graham |
| 7,100,969 B2 | 9/2006 | Choi et al. |
| 7,104,591 B1 | 9/2006 | Sanns |
| 7,147,270 B1 | 12/2006 | Andrus et al. |
| 7,152,908 B2 | 12/2006 | Shahbazi |
| 7,207,620 B2 | 4/2007 | Cosgrove et al. |
| 7,240,958 B2 | 7/2007 | Skopic |
| 7,255,387 B2 | 8/2007 | Wood |
| 2002/0021023 A1 | 2/2002 | Leban |
| 2003/0205913 A1 | 11/2003 | Leonard |
| 2006/0232102 A1 | 10/2006 | Steel |

FOREIGN PATENT DOCUMENTS

| | | |
|---|---|---|
| GB | 2063799 A | 6/1981 |
| GB | 2098558 A | 11/1982 |
| JP | 11115830 | 4/1999 |
| WO | WO 2004062953 | 7/2004 |

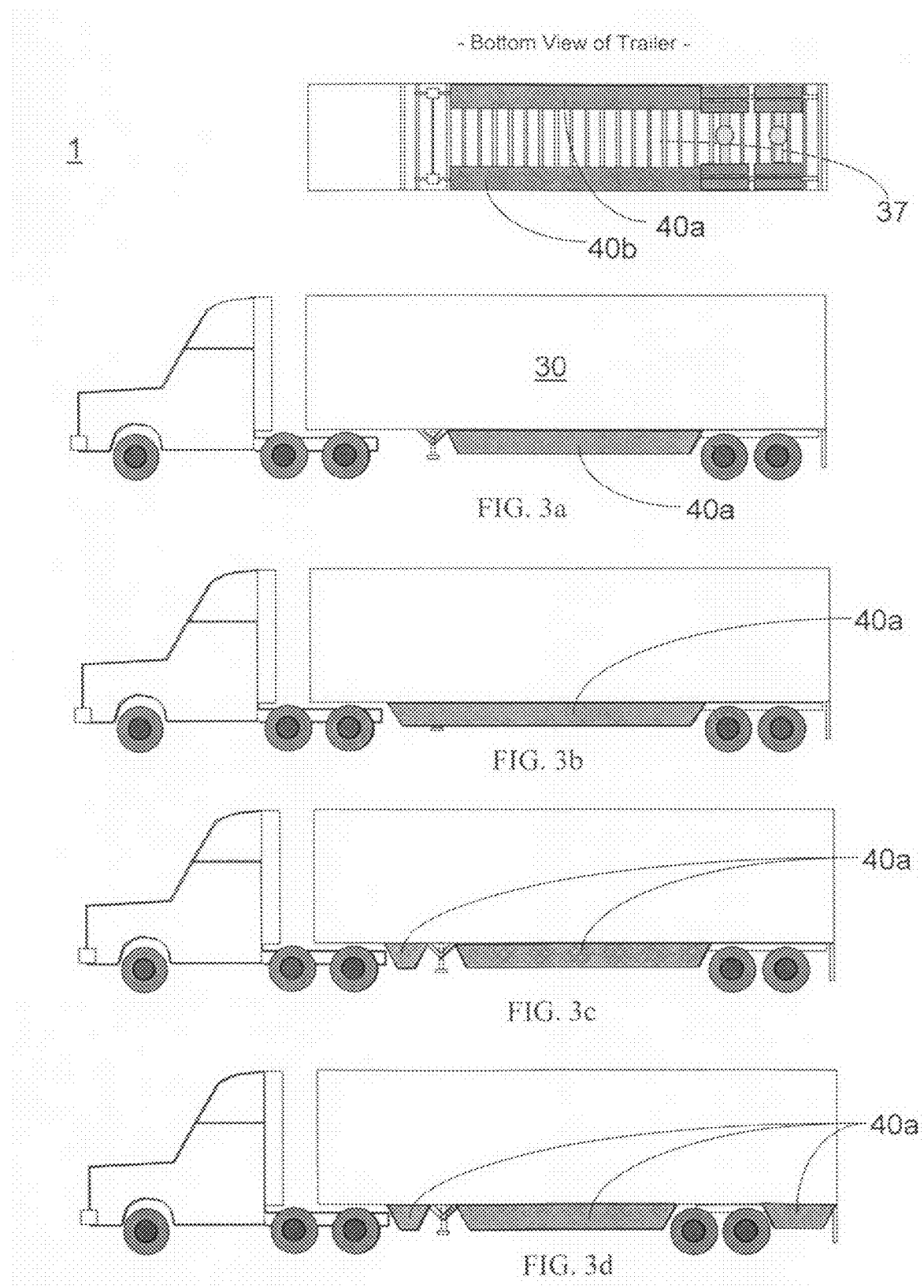

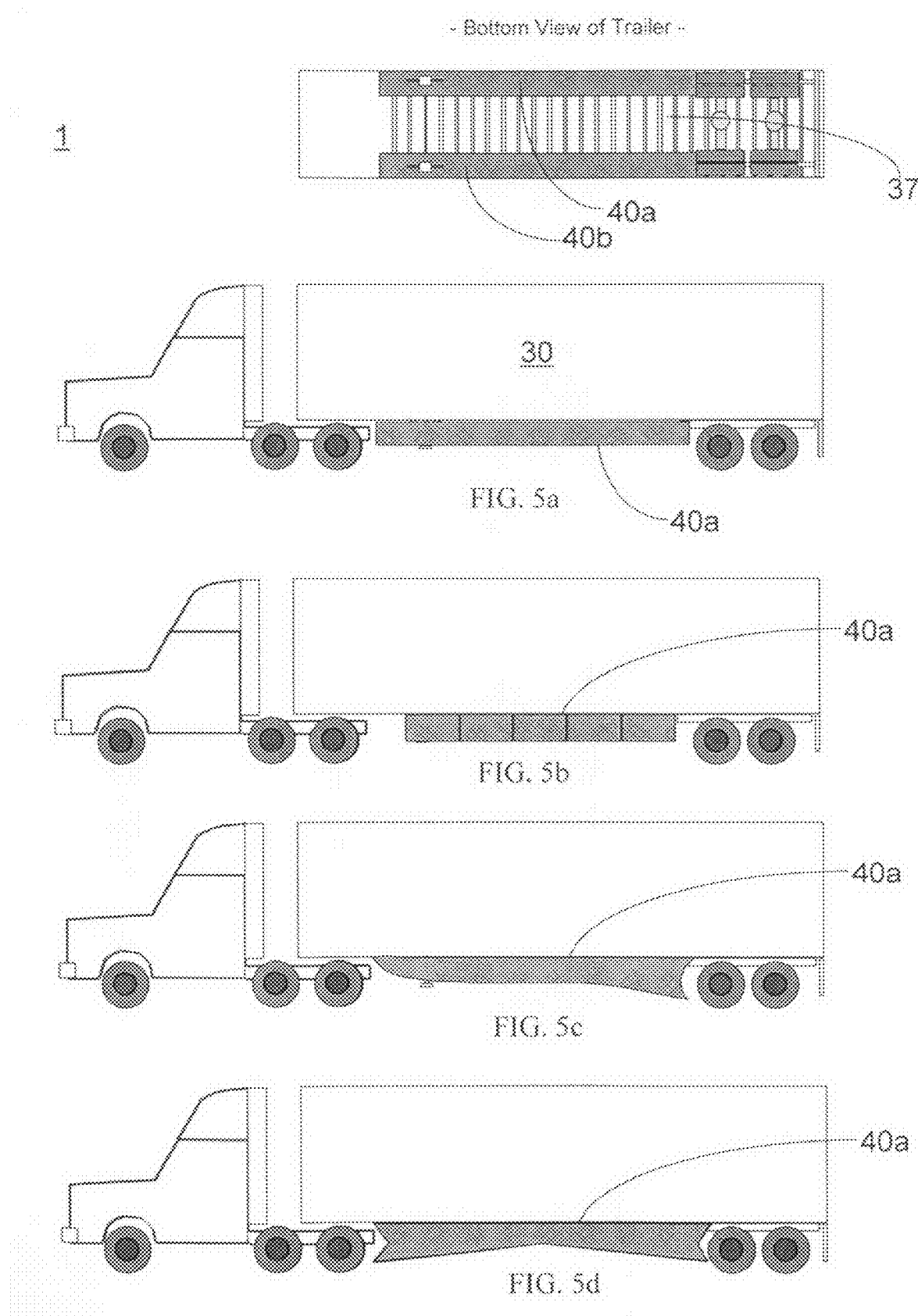

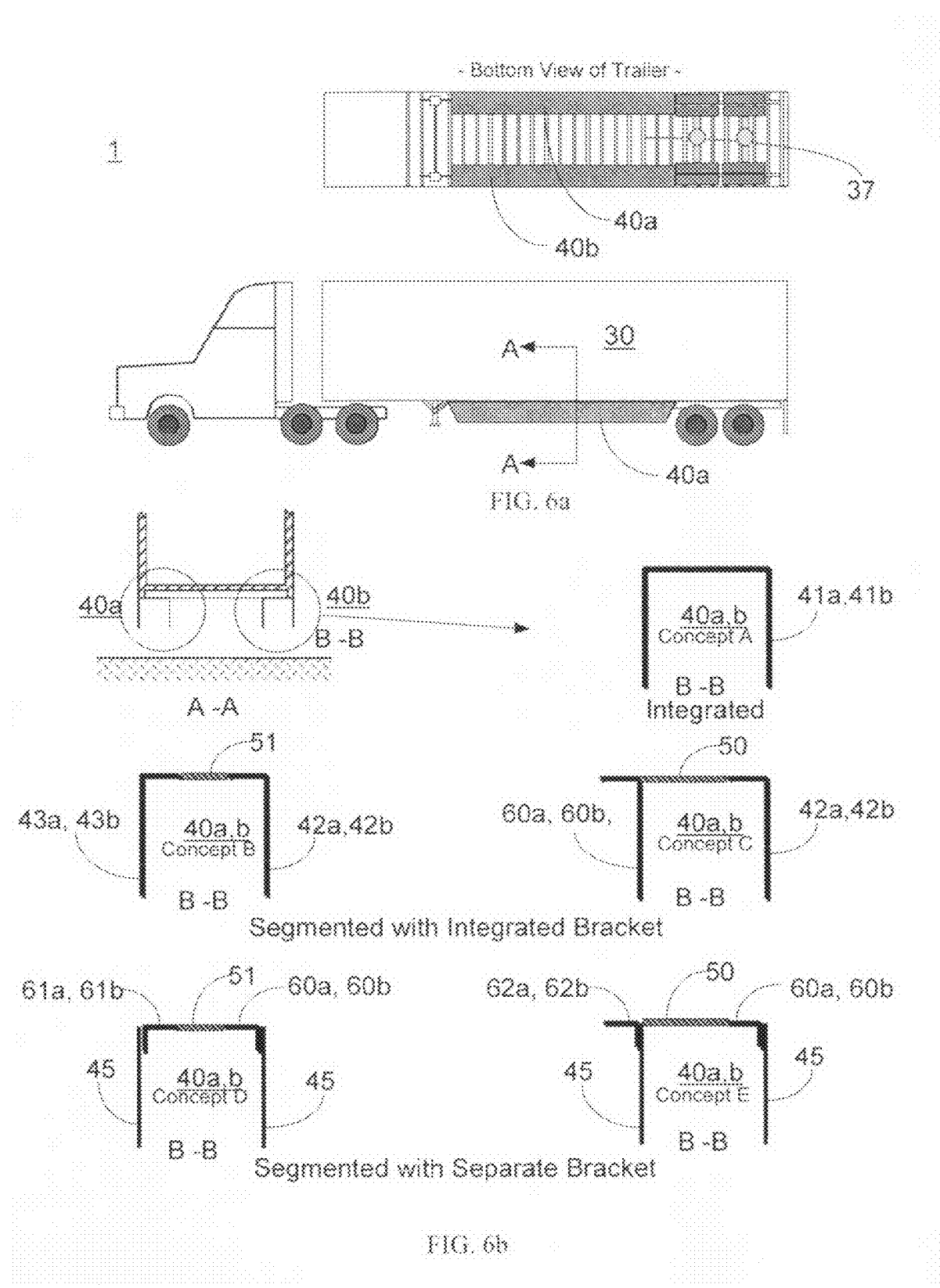

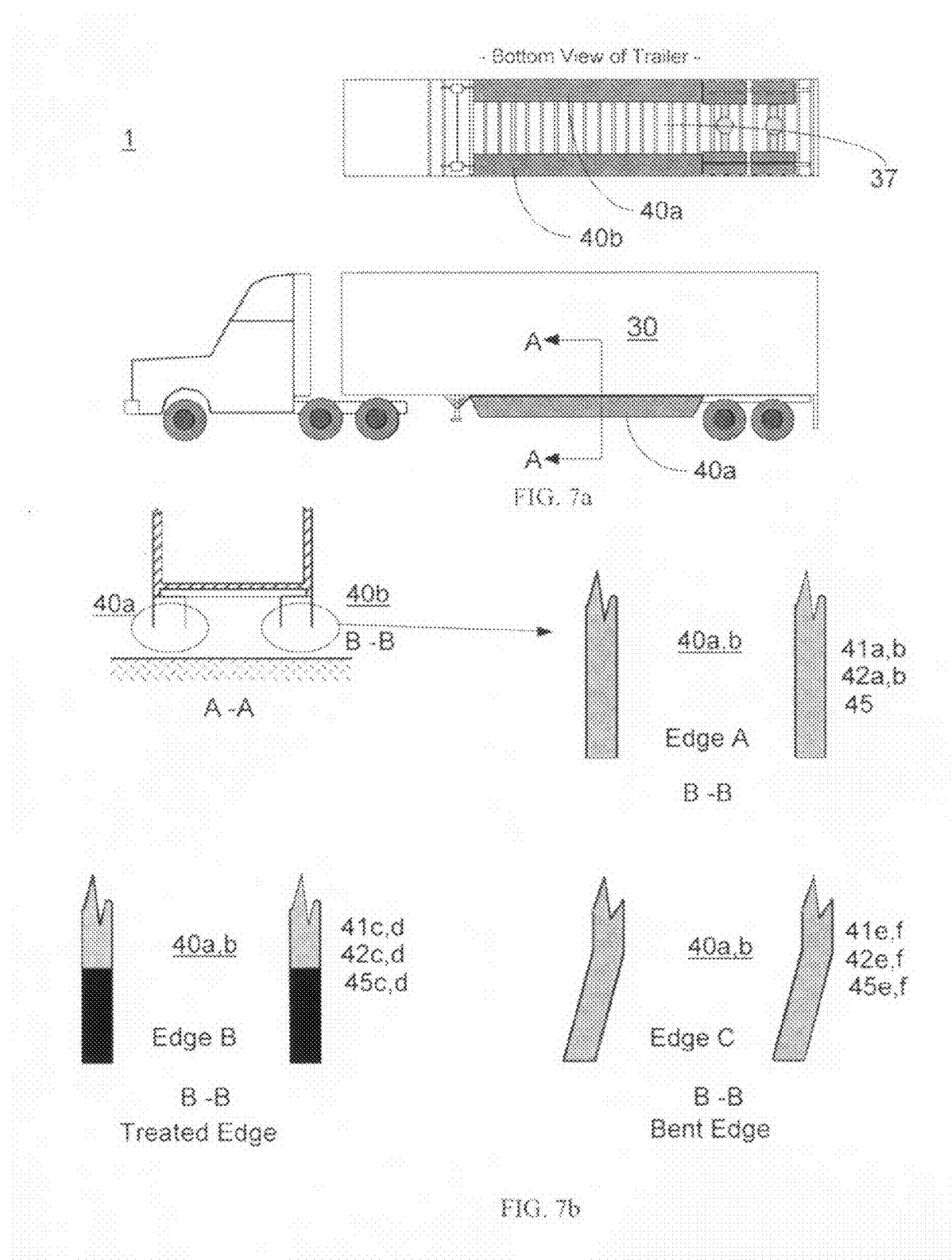

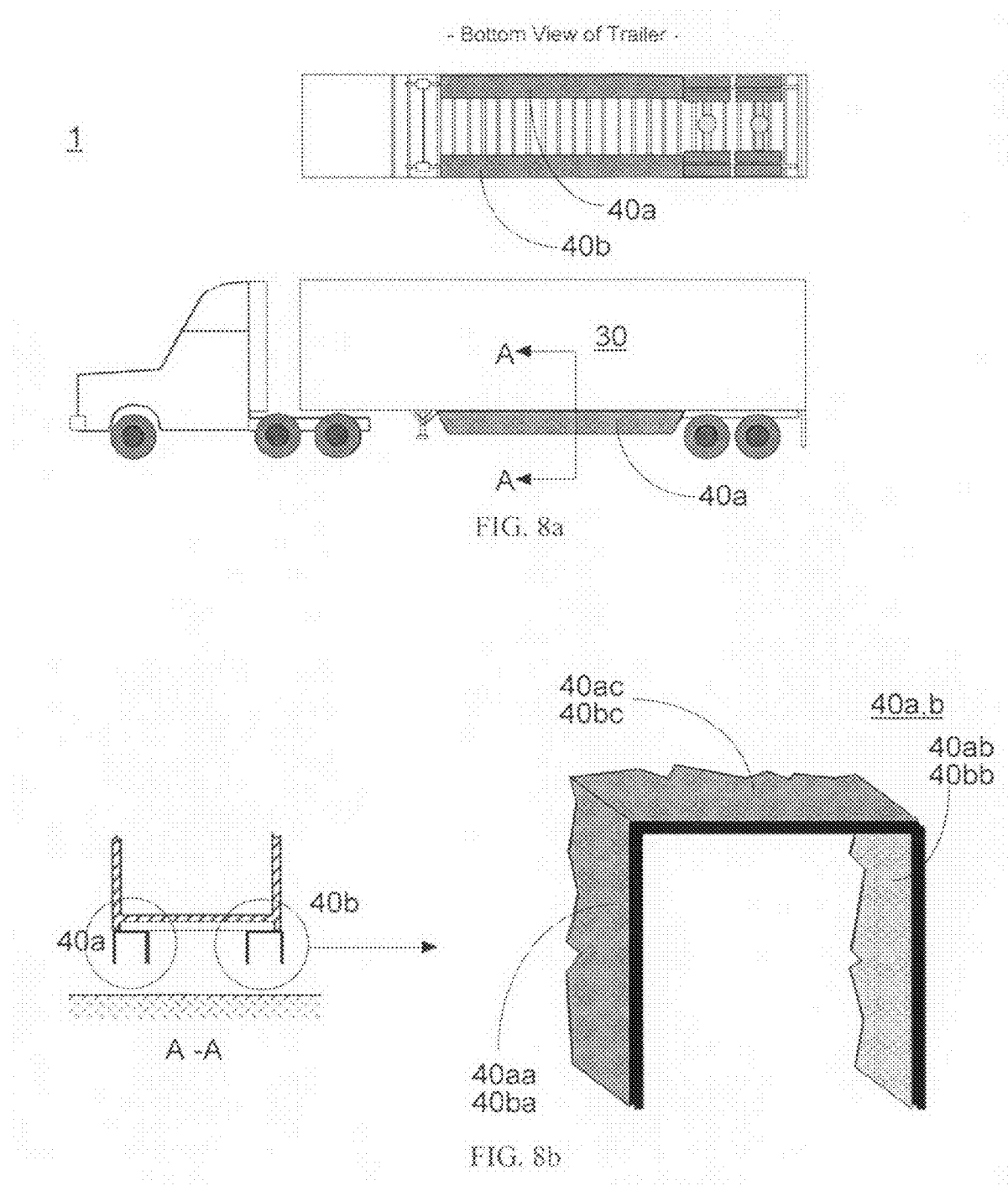

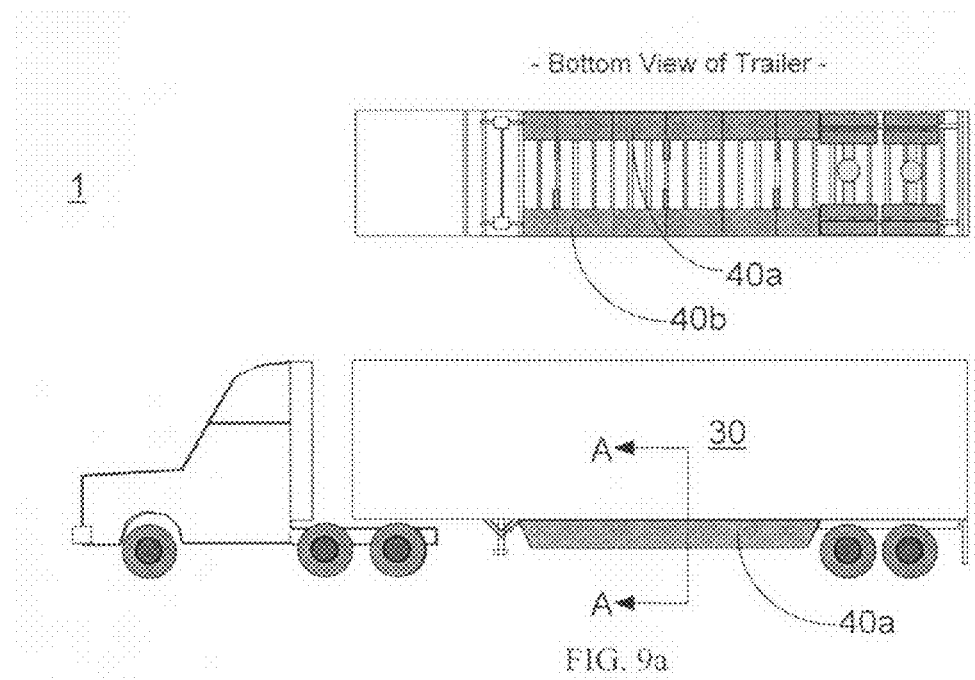
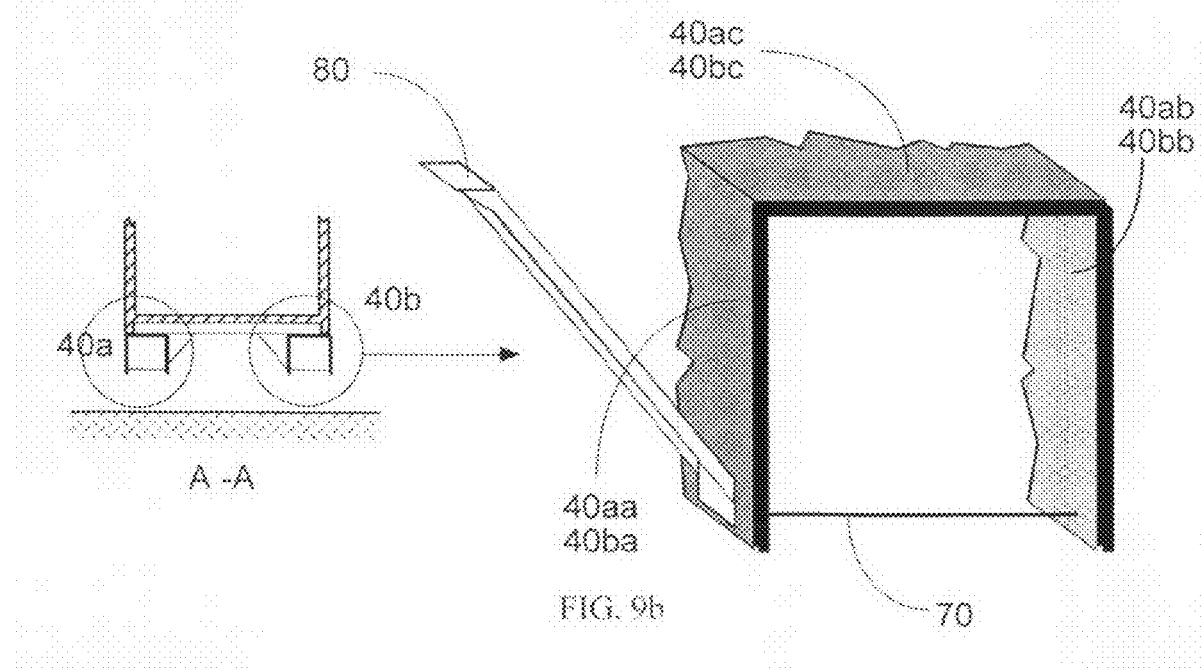
FIG. 9a
FIG. 9b

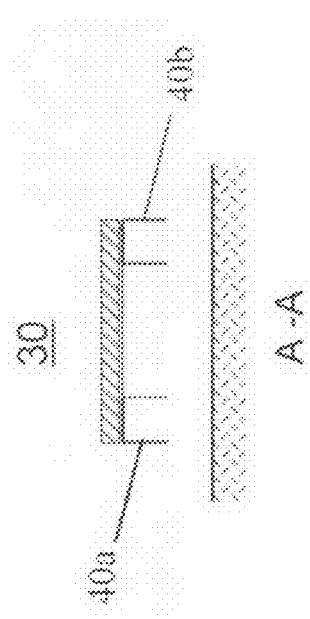
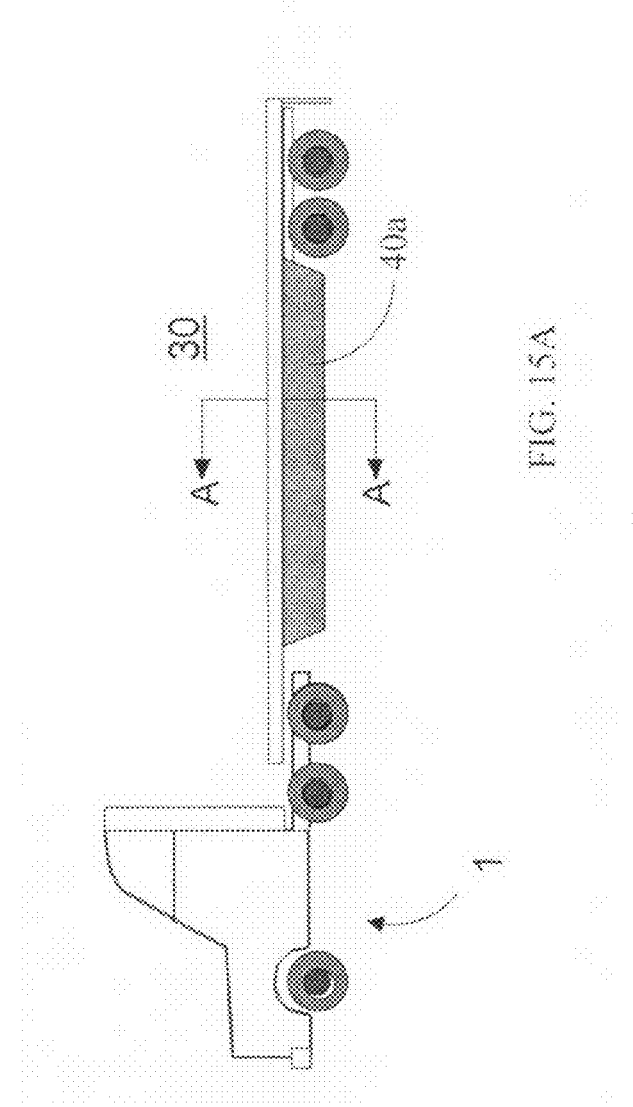

MINI SKIRT AERODYNAMIC FAIRING DEVICE FOR REDUCING THE AERODYNAMIC DRAG OF GROUND VEHICLES

CROSS-REFERENCE TO RELATED APPLICATION

This application is a continuation-in-part of prior application U.S. application Ser. No. 11/811,541 titled "Mini Skirt Aerodynamic Fairing Device for Reducing the Aerodynamic Drag of Group Vehicles," filed on Jun. 11, 2007, now U.S. Pat. No. 7,497,502 which claimed the benefit of U.S. Provisional Application No. 60/814,303, filed Jun. 19, 2006, the entire contents of both of which are incorporated herein by reference.

ORIGIN OF THE INVENTION

The invention described herein was made by employees of the United States Government, and may be manufactured and used by or for the Government without payment of any royalties thereon or therefore.

FIELD OF INVENTION

The invention relates to the reduction of aerodynamic drag for moving ground vehicles; specifically to an improved method and device for the reduction of aerodynamic drag and for improved performance and stability of ground vehicles by reducing the mass and velocity of the flow passing under a vehicle.

BACKGROUND OF THE INVENTION

The flow passing under a ground vehicle imparts a drag force to the vehicle when it impinges on and flows around the vehicle undercarriage components, landing gear, axels, brake components, mud flap systems, wheel wells and fenders, wheels, tires and various other vehicle components attached to or a part of the underside of a vehicle. The ground vehicle class of particular interest is a tractor-trailer truck system consisting of a motorized lead vehicle pulling one or more non-motorized vehicles. The present invention is designed to control the flow from entering the undercarriage region from the side of a trailer of a tractor-trailer truck system.

There have been several attempts to reduce the aerodynamic drag associated with the undercarriage of the trailer of a tractor-trailer truck system. Trailer undercarriage drag may comprise 25 percent of the total vehicle drag.

The trailer undercarriage is comprised of all the components located below the trailer floor deck surface and the ground or road surface and includes all components attached to the trailer in this region. The flow passing around the tractor-trailer truck vehicle enters the undercarriage region from the trailer side and from the tractor undercarriage region. The undercarriage flow of a trailer is characterized as unsteady and dynamic and comprised of various size and strength eddy currents. The unsteady nature of the undercarriage flow is a result of the flow interacting with the ground or road, rotating wheels, brake systems, axels, tractor undercarriage flow, and the various components comprising the trailer lower surface. Relative to the free stream static pressure, the undercarriage flow imparts an increased pressure on surfaces that face forward and a decreased pressure on surfaces that face aft. The increase in pressure acting on the forward-facing surfaces and the decreased pressure acting on the aft-facing surfaces both generate an aerodynamic drag force. It is estimated that the pressures acting on the trailer wheel assembly accounts for one-half of the undercarriage drag, with the remaining drag being attributed to the flow interacting with numerous small structures comprising the trailer undercarriage. Previous attempts have addressed the undercarriage drag by installing either spanwise or streamwise aerodynamic fairings to the trailer underside to either divert undercarriage flow from the trailer wheel assembly or to block flow from entering the undercarriage region from the trailer side. The flow diverter devices are spanwise fairings that mount to the trailer undercarriage immediately forward of the trailer wheel assembly. The flow diverter fairings are angled downward or outward to divert the undercarriage flow from the wheel assembly. The flow blocking devices are streamwise fairings that mount beneath the trailer outside edge between the trailer wheel assembly and the tractor rear wheel longitudinal position, when the tractor and trailer are joined. Both types of fairings show increased benefit with increased vertical extent of the fairing.

Conventional approaches have used the flow diverter undercarriage fairings to reduce the mass of undercarriage flow that impinges onto the trailer wheel assembly, as shown in U.S. Pat. Nos. 4,386,801, 4,486,046, and 4,640,541. These representative fairing devices, while successful in reducing the mass of flow impinging on the trailer wheel assembly and thereby reducing the wheel assembly drag, do not significantly affect the trailer undercarriage drag. The limited effectiveness of these devices is a result of the drag generated by the device, referred to as device drag. The device drag for these fairings may be equal to the wheel assembly drag. These devices only reduce the wheel assembly drag and do not reduce the remaining undercarriage drag associated with the various trailer components.

Other approaches have used the trailer undercarriage side fairings to reduce the mass and velocity of the flow entering the undercarriage region of a trailer, as shown in U.S. Pat. Nos. 4,611,847, 4,746,160, 5,280,990, 5,921,617, and 6,644, 720. These representative flow blocking devices, while successful in reducing the mass of flow entering the trailer undercarriage region are either simple rigid structures or they are complex active, flexible and variable geometry systems. The simple devices are designed to have a limited vertical and longitudinal extent in order to reduce the impact on operations and maintenance. Limiting the vertical and longitudinal extent of the device significantly reduces the flow blocking capability and results in a minimal aerodynamic drag reduction benefit. The complex devices typically have features that are active, flexible, and/or variable in order to maximize the flow blocking capability while minimizing the impact on operations. The complex devices typically consist of multiple components. The complexity of these devices results in increased weight, maintenance, and cost. Each of the trailer undercarriage flow blocking devices consists of a vertically extended structure that attaches to the trailer lower surface outer side edges. These devices are held in position by various support and bracing structures that are integrated into or attached to the inward facing surface of the flow blocking structure. The support and bracing structures add additional forward and rearward facing undercarriage elements that contribute to the undercarriage drag. These support and bracing structures also collect debris, snow and ice during operation resulting in an increase in maintenance and repair requirements.

SUMMARY OF THE INVENTION

The invention relates to an aerodynamic device for reducing drag on a ground vehicle. The device includes a first pair of rigid panels attached to the left side of the bottom surface of the vehicle and extending downward from the vehicle, including an outer panel substantially coplanar with the left surface of the vehicle and an inner panel located inboard of the outer panel; and a second pair of rigid panels attached to the right side of the bottom surface of the vehicle and extending downward from the vehicle, including an outer panel substantially coplanar with the right surface of the vehicle and an inner panel located inboard of the outer panel. The panels on the left or right side of the vehicle may be comprised of a single panel or of multiple longitudinal segments. Each panel typically extends downward from the vehicle a distance of less than about 90% of the distance from the bottom surface of the vehicle to the surface that the vehicle is moving over. Each panel in the pairs may extend downward a substantially equal distance from the bottom surface of the vehicle, the shape and distance of the downward extension may vary along the length of the panel.

In one embodiment, the pair of panels is integrally connected to each other by a horizontal panel. The pair of panels may also be connected by a horizontal panel that is separate from the pair. The panels may also be an integral extension of the side surface of the vehicle. The panels may have various profiles, such as a swept leading or trailing edge. In one embodiment, the panels are connected to the vehicle such that the panels may be folded so as to be substantially adjacent and proximate the bottom surface of the vehicle when not in use. The pairs of panels may also be slidably connected to the vehicle such that the panels slide longitudinally along the vehicle. The distance between at least one of the first or second pairs of panels may be adjustable. The pairs of panels may further include one or more additional panels located inboard from the existing panel pair. For example, a third or more panels may be included in each panel grouping.

One aspect of the invention is to prohibit flow from entering the trailer undercarriage region and interacting with the complex geometry comprising the trailer undercarriage and wheel assembly by creating two similar structures that attach to the trailer underside near the two outside edges of the trailer. The two similar structures comprising the present invention are light-weight aerodynamic fairings that attach to the undercarriage of a dry van, refer, flat deck, or tanker trailer near the two outside edges of the trailer. The two similar structures are of minimum vertical extent and include two vertically aligned surfaces and one horizontal surface that attach to the underside of the trailer near the trailer outside edge. The outer edge of each structure is positioned parallel to and below each outer side edge of the trailer. Each structure extends as close as practical to the ground based upon operational and maintenance criteria. Each structure is located longitudinally between the trailer wheel assembly and the tractor aft wheel set. Each structure is variable in length and is capable of covering a variable longitudinal distance between the trailer wheel assembly and the tractor rear wheels.

The flow blocking performance of each of the two structures is enhanced through the effective use of three flow control concepts: vortex generation, upwash management, and ground effect interference. Each of the two structures accomplishes the flow control and drag reduction goals with two vertically orientated surfaces and one horizontal surface. The two vertically orientated surfaces are an outer vertical surface located at the outside edge of the trailer and an inner vertical surface located inboard of the first surface. The horizontal surface extends between the two upper edges of the two vertical surfaces to create an inverted "U" shaped channel. The two vertical surfaces of each structure are of equivalent longitudinal and vertical length and the lower edge of both surfaces is aerodynamically sharp.

Each of the two structures may be comprised of multiple longitudinal segments. At a minimum each structure is comprised of a single segment. In a preferred embodiment, the structure has a forward longitudinal segment, center longitudinal segment and an aft longitudinal segment. The center longitudinal segment may be further divided into multiple center longitudinal segments to address installation, maintenance, and operational concerns. A single longitudinal segment is comprised of a single outer vertical surface element, a single inner vertical surface element, and a single horizontal surface element. The forward longitudinal segment of each structure has a forward edge that is shaped to meet the operational, maintenance, and performance needs of the user and is aerodynamically sharp. Each center longitudinal segment of the structure has a forward edge that is shaped to join the rear edge of the segment immediately forward of the segment and a rear edge that is shaped to join the forward edge of the segment immediately aft of the segment. The rear longitudinal segment of each structure has a rear edge that is shaped to meet the operational, maintenance, and performance needs of the user and is aerodynamically sharp. The rear longitudinal segment fairing may longitudinally extend forward and rearward to adjustably locate its rearward edge in a selected position forward of the trailer's wheel assembly. The longitudinal adjustment of the rear segment is by means of a slide engagement with the center longitudinal segment located adjacent and forward of the rear longitudinal segment.

The outer vertical surface of the structure is designed to both block flow from entering the undercarriage region and to turn the flow passing under the outer vertical surface upward thereby creating an upwash field between the two vertical surfaces. The upwash field is generated by means of a coherent vortex structure emanating from the aerodynamically sharp lower edge of the outer surface. The inner vertical surface blocks the upwash field from flowing inboard and interacting with the trailer undercarriage and wheel assembly. The horizontal surface blocks the upwash flow from interacting with the trailer undercarriage in the region between the two vertical surfaces. The result of the flow control techniques allows the present invention to block a significantly greater mass of flow from entering the undercarriage region compared to a fairing with a single vertical surface of equal vertical extent. The addition of a horizontal surface between the two vertical surfaces ensures that the blocked upwash flow does not generate a drag force. The invention also takes advantage of the increased turbulence in the flow adjacent to the road surface at the side edge of the trailer to further promote upwash thereby increasing the effective blocking area of the structure. Although upwash is present for all existing trailer undercarriage flow blocking fairings, the present invention is the only device that captures the upwash field and thereby controls a greater mass of air from entering the undercarriage region by means of the inner vertical surface and ensues that the blocked and captured flow does not generate a drag by means of the horizontal surface. The ability of the present invention to block a greater mass of flow with less vertical extent from the trailer undercarriage, compared to existing single surface fairings, allows the present invention to provide a larger vertical gap between the ground or road surface and the invention lower edge, thereby eliminating the need for vertically movable, deflectable, and actuated surfaces to adapt to various surface and/or road structures that may impact the lower edge of the fairing. It also results in a reduced aerodynamic load on the vertical surfaces that eliminates the need for structural bracing and supports, thereby reducing or eliminating device drag. Components of the invention may be smooth and aligned parallel with the vehicle axis, thereby eliminating device associated pressure drag.

An alternative embodiment of the aerodynamic device or structure may have a first pair of rigid panels attached to the left side of the bottom surface of the vehicle, extending downward from the vehicle, with an outer panel substantially coplanar with the left surface of the vehicle and an inner panel located inboard of the outer panel. The first pair of rigid panels is configured with each panel extending downward from the vehicle a desired first vertical distance and having a lower edge that is aerodynamically sharp and wherein the outer panel is separated from the inner panel at the lower edges by a first horizontal distance. A second pair of rigid panels is attached to the right side of the bottom surface of the vehicle and extending downward from the vehicle, including an outer panel substantially coplanar with the right surface of the vehicle and an inner panel located inboard of the outer panel. The second pair of rigid panels is configured with each panel extending downward from the vehicle a desired second vertical distance and having a lower edge that is aerodynamically sharp and wherein the outer panel is separated from the inner panel at the lower edges by a second horizontal distance. The first and second pairs of rigid panels are configured so as to form a first and second inverted U-shaped channel open to the downward direction, with the panels further configured to generate a vortex within the channel when the ground vehicle is in motion, wherein the vortex has an axis of rotation aligned with the direction of motion of the ground vehicle. In this example, at least a portion of at least one inner panel is inclined inwardly as it extends downward so that the horizontal distance between the inner and outer panels at the lower edge of the panels is greater than the horizontal distance between the inner and outer panels proximate to the bottom surface of the vehicle.

Another alternative embodiment of the aerodynamic device or structure has a first pair of rigid panels attached to the left side of the bottom surface of the vehicle and extending downward from the vehicle, including an outer panel attached inboard and proximate to the left surface of the vehicle and an inner panel located inboard of the outer panel. The first pair of rigid panels are configured with each panel extending downward from the vehicle a desired first vertical distance and having a lower edge that is aerodynamically sharp and wherein the outer panel is separated from the inner panel at the lower edges by a first horizontal distance. A second pair of rigid panels attached to the right side of the bottom surface of the vehicle and extending downward from the vehicle, including an outer panel attached inboard and proximate to the right surface of the vehicle and an inner panel located inboard of the outer panel. The second pair of rigid panels are configured with each panel extending downward from the vehicle a desired second vertical distance and having a lower edge that is aerodynamically sharp and wherein the outer panel is separated from the inner panel at the lower edges by a second horizontal distance. The first and second pairs of rigid panels are configured so as to form a first and second inverted U-shaped channel open to the downward direction, with the panels further configured to generate a vortex within the channel when the ground vehicle is in motion, wherein the vortex has an axis of rotation aligned with the direction of motion of the ground vehicle, wherein at least a portion the first and second outer panels is inclined outwardly without exceeding the plane of the left or right surfaces of the vehicle, respectively, and the horizontal distance between the inner and outer panels proximate to the bottom surface of the vehicle is less than the horizontal distance between the inner and outer panels at the lower edge of the panels.

Another alternative embodiment of the aerodynamic device or structure has a first pair of rigid panels attached to the left side of the bottom surface of the vehicle and extending downward from the vehicle, including an outer panel substantially coplanar with the left surface of the vehicle and an inner panel located inboard of the outer panel. The first pair of rigid panels is configured with each panel extending downward from the vehicle a desired first vertical distance and having a lower edge that is aerodynamically sharp and wherein the outer panel is separated from the inner panel at the lower edges by a first horizontal distance. A second pair of rigid panels is attached to the right side of the bottom surface of the vehicle and extending downward from the vehicle, including an outer panel substantially coplanar with the right surface of the vehicle and an inner panel located inboard of the outer panel. The second pair of rigid panels is configured with each panel extending downward from the vehicle a desired second vertical distance and having a lower edge that is aerodynamically sharp and wherein the outer panel is separated from the inner panel at the lower edges by a second horizontal distance. The first and second pairs of rigid panels are configured so as to form a first and second inverted U-shaped channel open to the downward direction, with the panels further configured to generate a vortex within the channel when the ground vehicle is in motion, wherein the vortex has an axis of rotation aligned with the direction of motion of the ground vehicle. In this example, at least a portion of the first and second inner panels is inclined outwardly, and wherein the horizontal distance between the inner and outer panels proximate to the bottom surface of the vehicle is greater than the horizontal distance between the inner and outer panels at the lower edge of the panels.

Another alternative embodiment of the aerodynamic device has a first pair of rigid panels attached to the left side of the bottom surface of the vehicle and extending downward from the vehicle, including an outer panel attached proximate to the left surface of the vehicle and an inner panel located inboard of the outer panel. The first pair of rigid panels is configured with each panel extending downward from the vehicle a desired first vertical distance and having a lower edge that is aerodynamically sharp and wherein the outer panel is separated from the inner panel at the lower edges by a first horizontal distance. A second pair of rigid panels is attached to the right side of the bottom surface of the vehicle and extending downward from the vehicle, including an outer panel attached proximate to the right surface of the vehicle and an inner panel located inboard of the outer panel. The second pair of rigid panels is also configured with each panel extending downward from the vehicle a desired second vertical distance and having a lower edge that is aerodynamically sharp and wherein the outer panel is separated from the inner panel at the lower edges by a second horizontal distance. The first and second pairs of rigid panels are configured so as to form a first and second inverted U-shaped channel open to the downward direction, with the panels further configured to generate a vortex within the channel when the ground vehicle is in motion, wherein the vortex has an axis of rotation aligned with the direction of motion of the ground vehicle. In this example, the first and second outer panels are inclined inwardly but substantially proximate to the plane of the left or right surfaces of the vehicle, respectively, and wherein the horizontal distance between the inner and outer panels proximate to the bottom surface of the vehicle is greater than the horizontal distance between the inner and outer panels at the lower edge of the panels.

These alternate embodiments may incorporate a number of structural variations. For example, the aerodynamic device may include one or more of the panels on the left or right side of the vehicle that are comprised of multiple longitudinal segments. In one embodiment, each panel may extend downward from the vehicle a distance of less than about 90% of the distance from the bottom surface of the vehicle to the surface that the vehicle is moving over. Each panel of at least one of the first pair or second pair may extend downward a substantially equal distance from the bottom surface of the vehicle. In another example, at least one panel may extend downward a distance that varies along its length. An embodiment may include at least one of the first or second pairs of panels being integrally connected to each other by a horizontal panel. This horizontal panel located between the outer and inner panels may be separate from the pair of panels. At least one of the first or second pairs of panels may be an integral extension of the side surface of the vehicle. In another example, at least one panel has a swept leading edge. Optionally, the panels may be folded so as to be substantially adjacent and proximate the bottom surface of the vehicle when not in use. Also, at least one of the first or second pairs of panels may be slidably connected to the vehicle such that the panels slide longitudinally along the vehicle. In some cases, the distance between at least one of the first or second pairs of panels may be adjustable.

BRIEF DESCRIPTION OF THE DRAWINGS

The invention will be better understood in relation to the attached drawings illustrating preferred embodiments, wherein:

FIGS. 3A-3D are side views of a tractor-trailer truck with alternate embodiments of the invention installed;

FIGS. 5A-5D are side views of a tractor-trailer truck with alternate embodiments of the invention installed;

FIGS. 6A-6B is a side view and cross-section views of the present invention illustrating various installation and fabrication concepts;

FIGS. 7A-7B is a side view and cross-section views of the present invention illustrating various edge treatments and fabrication concepts;

FIGS. 8A-8B is a side view, perspective view, and cross-section view of the invention illustrating the preferred stiffening and mounting concept.

FIGS. 9A-9B is a side view, perspective view, and cross-section view of the invention illustrating an alternate stiffening and mounting concept.

FIG. 15A is a side view of a flat bed application, FIG. 15B is a rear view.

DETAILED DESCRIPTION OF THE PREFERRED EMBODIMENTS

The following descriptions are of exemplary embodiments of the invention only, and are not intended to limit the scope, applicability or configuration of the invention in any way. Rather the following description is intended to provide a convenient illustration for implementing various embodiments of the invention. As will become apparent, various changes may be made in the function and arrangement of the elements described herein without departing from the spirit and scope of the invention. For example, though not specifically described, many shapes, widths, leading edge shapes, spacing and orientation of the forward extended plurality of panels, candidate vehicles that can benefit from the device, fabrication means and material, attachments means and material should be understood to fall within the scope of the present invention.

Referring now in detail to the drawings, like numerals herein designate like numbered parts in the figures.

Figure 1A:
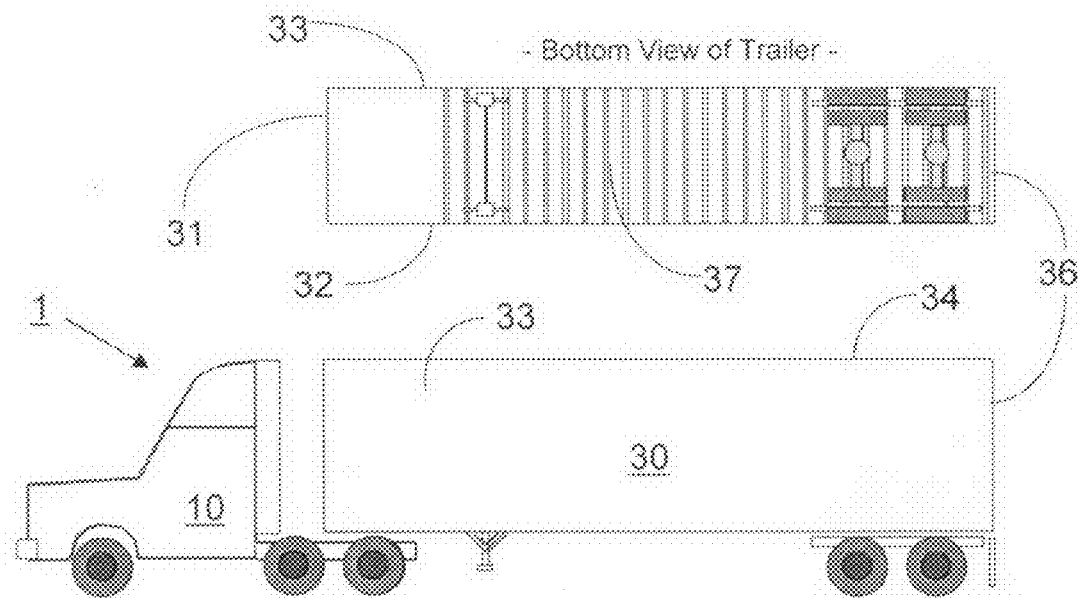
FIG. 1A is a side and lower surface view of a tractor-trailer truck system.
Figure 1B:
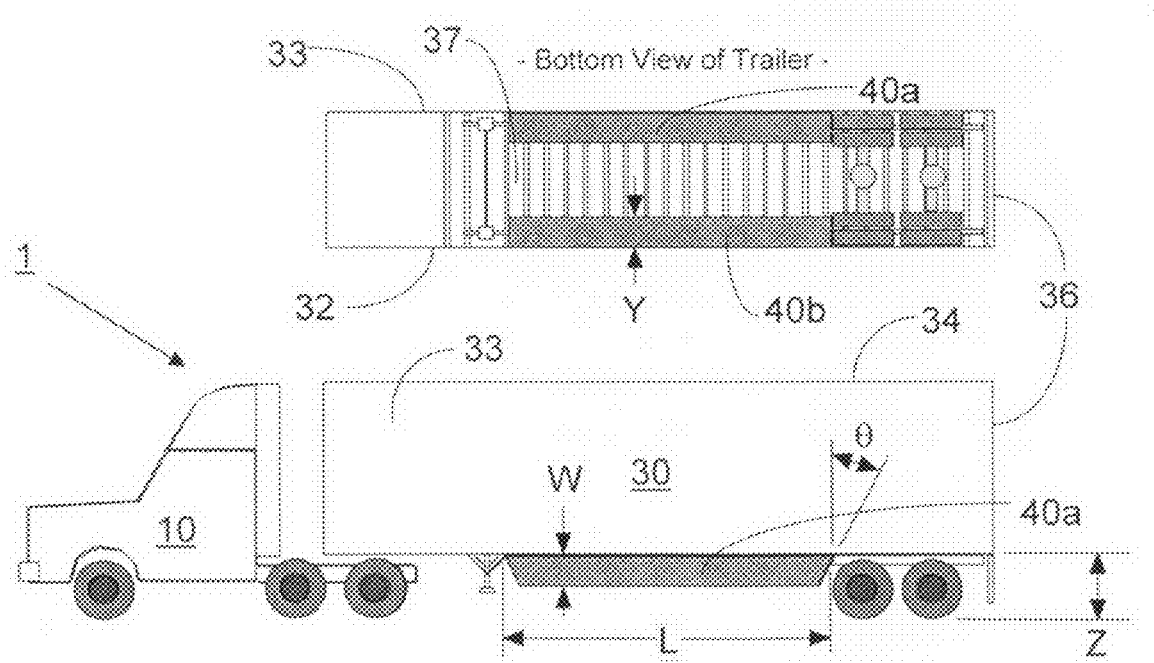
FIG. 1B is a side and lower surface view of a tractor-trailer truck system with the present invention installed on the lower surface of the trailer.

FIG. 1 shows a typical ground vehicle or tractor-trailer truck system 1, for example, comprised of a powered tractor 10 that pulls a trailer 30. The trailer 30 is comprised of a front surface 31, side surfaces 32 and 33, a top surface 34, a rear surface 36, and a lower surface 37. FIG. 1 shows a side and lower surface view of a typical trailer 30 of a tractor-trailer truck with and without the present invention installed on the lower floor surface 37 of a trailer 30. The device 40 is comprised of two structures 40a and 40b that extended downward from the vehicle lower surface 37. The downward extent of each panel is typically anywhere less than about 90% of the distance from the trailer lower surface to the surface or road that the vehicle is moving over. Each of the two structures, 40a and 40b, are positioned with the outer vertical surface, aligned approximately with the plane of the trailer side surface 32 or 33. Of course, the present invention may be used with flat bed trailers or vehicles as well, in which the plane of side surfaces 32 or 33 may be somewhat notional. The inner vertical surface of each structure 40a, 40b is positioned inboard of the outer vertical surface. Each structure has a width W, a transverse Y, and a length L. The leading edge and trailing edge of each structure is swept an angle θ. To facilitate access to the vehicle undercarriage, each panel of the device 40 may be either removed through a quick disconnect mechanism or folded out of the way, so as to be substantially adjacent and proximate the lower surface 30. The length L of each structure, 40a and 40b, of the device 40 is determined by the geometric characteristics of the vehicle 30, the operational requirements of the vehicle 30, and the maintenance requirements of the vehicle 30. It is desirable that each structure, 40a and 40b, of the device 40 extend between a point forward of the trailer rear wheel assembly to a point aft of the tractor rear wheel set. The width W of each structure, 40a and 40b, of the device 40 is determined by the geometric characteristics of the vehicle 30, the operational requirements of the vehicle 30, and the maintenance requirements of the vehicle 30. The type, size, and structure of the hardware used to attach the invention to the trailer undercarriage is determined by the geometric characteristics of the vehicle 30, the operational requirements of the vehicle 30, and the maintenance requirements of the vehicle 30.

Figure 2A:
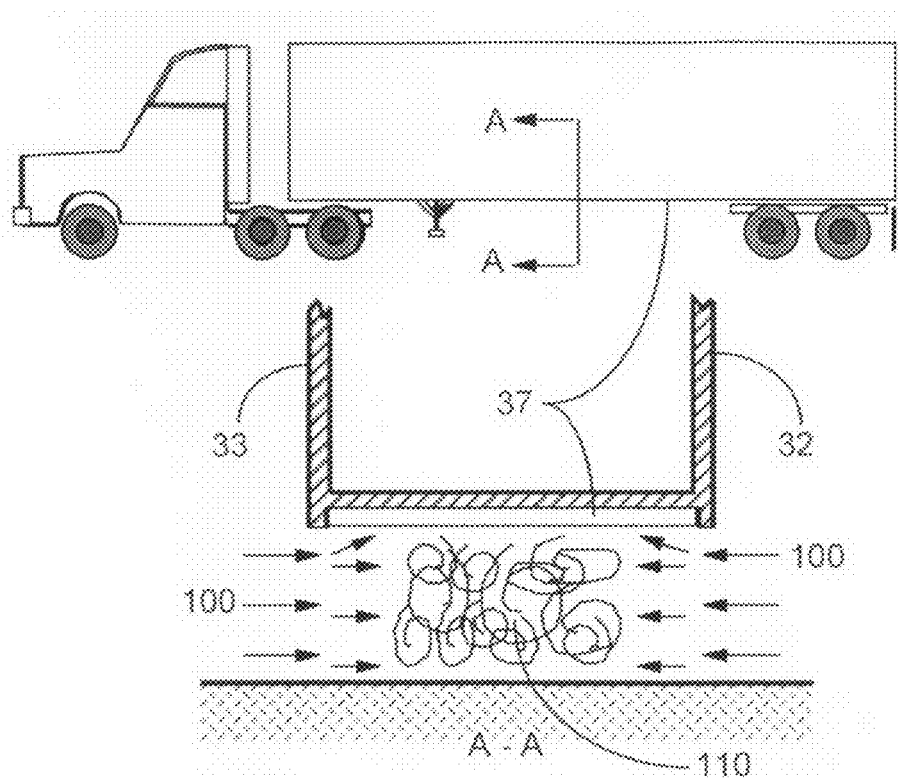
FIGS. 2A-B are cross section views, in a plane perpendicular to the ground, of the undercarriage flow conditions for a tractor-trailer system with and without the present invention installed.
Figure 2B:
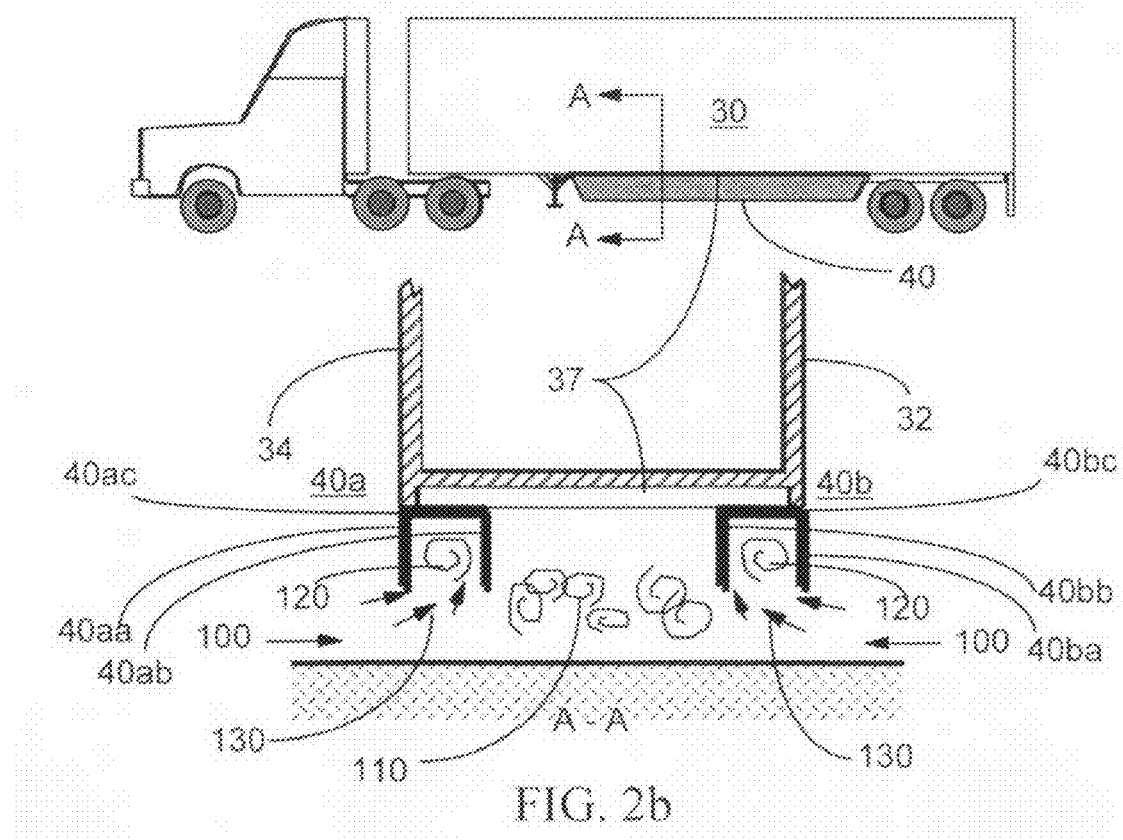

FIGS. 2A and 2B show flow patterns in the undercarriage region of trailer 30 of a tractor-trailer truck with and without the present invention installed. In FIG. 2A and FIG. 2B, the airflow about the vehicle and in the undercarriage region is represented by arrow-tipped lines 100 and 130 and swirl structures 110 and 120. The arrow-tipped lines 100 represent the free stream flow entering the undercarriage region. The arrow-tipped lines 130 represent the upwash flow entering the region bound by the outer vertical surface and inner vertical surface of the device 40. The swirl structures 110 represent rotational, random, unsteady eddy flow. The swirl structures 120 represent coherent vortex flow structures.

FIG. 2A shows a cross-section view, in a plane perpendicular to the ground, of the undercarriage of a trailer 30 with side surfaces 32 and 33 and a base or floor surface 37. FIG. 2A also shows the undercarriage flow 100 and 110, without the present invention installed. For a trailer moving over a surface or road, the free stream flow 100 turns inboard and enters the undercarriage region of the trailer 30. The freestream flow interacts with the various vehicle components and becomes unstructured and dynamic and includes random size and strength eddies 110. The dynamic, random undercarriage flow interacts with the vehicle undercarriage structures resulting in a large drag force.

FIG. 2B shows a cross-section view, in a plane perpendicular to the ground, of the undercarriage of a trailer 30 with side surfaces 32 and 33 and a floor surface 37 and the two inverted U-shaped channel structures 40a and 40b comprising the device 40. Each structure, 40a and 40b, comprising the device 40 contains three primary surfaces; an outer vertical surface, 40aa and 40ba, an inner vertical surface, 40ab and 40bb, and a base surface, 40ac and 40bc, where the base surface in this embodiment extends between or connecting the upper most edge of the outer vertical surface and inner vertical surface comprising each structure 40a and 40b. This approach may be considered to be an embodiment in which the first or second pairs of vertical surfaces or panels are integrally connected to each other by a base surface 40ac and 40bc or panel. As an alternative (not shown) to the approach illustrated in FIG. 2b, base surfaces 40ac (for structure 40a) and 40bc (for structure 40b) may be provided by floor surface 37. That is, a portion of the floor surface 37 may be exposed to the extent of the transverse Y between, for example with structure 40a, vertical surfaces 40aa and 40ab. FIG. 2B also shows the undercarriage flow 100, 110 and 120, with this embodiment of the device 40 installed. For a trailer moving over a surface or road, the free stream flow 100 is directed aft along the outward facing surface of the outer vertical surfaces, 40aa and 40ba, of the device 40. A portion of the free stream flow 100 located near the ground or road surface turns inboard and impinges on the lower edge of the outer vertical surface, 40aa and 40ba, of the device 40 and results in a coherent vortex structure 120 that is located between the outer vertical surface, 40aa and 40ba, and inner vertical surface, 40ab and 40bb. The creation of the vortex structure 120 results in the generation of an upwash field 130 that redirects a significant portion of the inward-flowing free stream flow 100 upward and into the channel created by the outer vertical surfaces 40aa and 40ba and the inner vertical surfaces 40ab and 40bb. The upwash effect reduces the mass of free stream flow entering the undercarriage region and interacting with the undercarriage structure of trailer 30 undercarriage region. Reducing the mass of the dynamic, random undercarriage flow that interacts with the vehicle undercarriage structures results in a reduced drag force.

FIGS. 3A-3D are side and bottom views of a tractor trailer ground vehicles 1 with an embodiment of device 40 installed on the trailer 30 lower surface 37. FIG. 3A shows a single segment version of the device 40 including structures 40a and 40b with swept leading and trailing edges installed between the trailer landing gear and the trailer wheel assembly. FIG. 3B shows a single segment version of the device 40 including structures 40a and 40b with swept leading and trailing edges installed between the tractor rear wheels and the trailer wheel assembly. FIG. 3C shows a two segment version of the device 40 including structures 40a and 40b with swept leading and trailing edges installed between the tractor rear wheels and the trailer wheel assembly. FIG. 3D shows a three segment version of the device 40 including structures 40a and 40b with swept leading and trailing edges installed between the tractor rear wheels and the rear of the trailer.

Figure 4A:
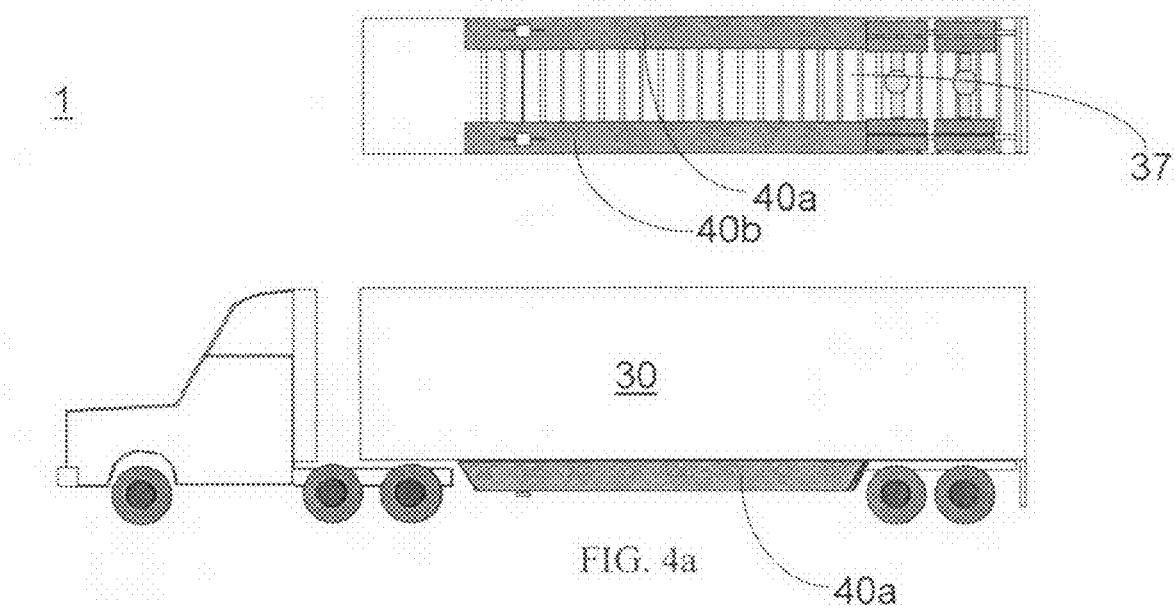
FIGS. 4A-4C are side views of a tractor-trailer truck with alternate embodiments of the invention installed.
Figure 4B:
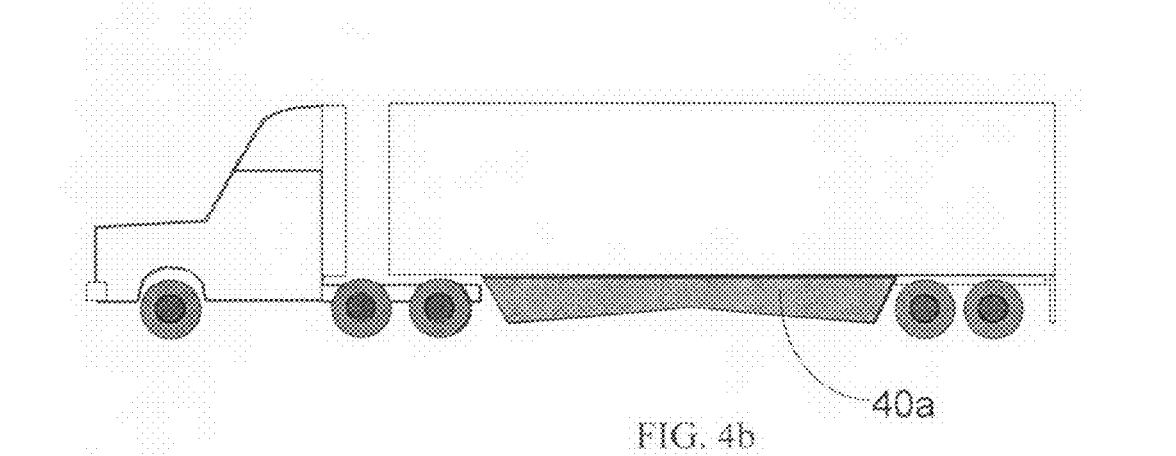
Figure 4C:
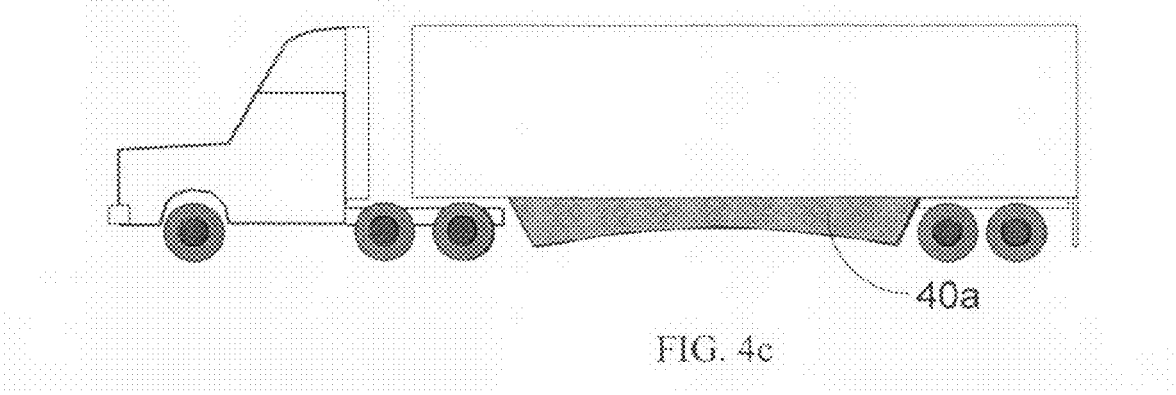

FIGS. 4A-4C are side and bottom views of a tractor trailer ground vehicles 1 with an embodiment of device 40 installed on the trailer 30 lower surface 37. FIG. 4A shows a single segment version of the device 40 including structures 40a and 40b with swept leading and trailing edges installed between the tractor rear wheels and the trailer wheel assembly. FIG. 4B shows a single segment version of the subject invention 40 including structures 40a and 40b with swept leading and trailing edges installed between the tractor rear wheels and the trailer wheel assembly and that has a varying vertical extent that varies linearly from a maximum at the forward most position to a minimum at the mid point and to a maximum at the rear most position. FIG. 4C shows a single segment version of the device 40 including structures 40a and 40b with swept leading and trailing edges installed between the tractor rear wheels and the trailer wheel assembly and that has a varying vertical extent that varies nonlinearly from a maximum at the forward most position to a minimum at the mid point and to a maximum at the rear most position.

FIG. 5A-5D are side and bottom views of a tractor trailer ground vehicles 1 with an embodiment of device 40 installed on the trailer 30 lower surface 37. FIG. 5A shows a single segment version of the device 40 including structures 40a and 40b with unswept leading and trailing edges installed between the tractor rear wheels and the trailer wheel assembly. FIG. 5B shows a multiple-segment version of the device 40 including structures 40a and 40b with unswept leading and trailing edges installed between the tractor rear wheels and the trailer wheel assembly. FIG. 5C shows a single segment version of the device 40 including structures 40a and 40b with complex curved leading edges, bottom edges and trailing edges installed between the tractor rear wheels and the trailer wheel assembly. FIG. 5D shows a single segment version of the device 40 including structures 40a and 40b with notched leading edges and trailing edges installed between the tractor rear wheels and the trailer wheel assembly and that has a varying vertical extent that varies linearly from a maximum at the forward most position to a minimum at the mid point and to a maximum at the rear most position.

FIG. 6A are side and bottom views of a tractor trailer ground vehicles 1 with the device 40 installed on the trailer 30 lower surface 37. FIG. 6A shows a single segment version of the device 40 including structures 40a and 40b with swept leading and trailing edges installed between the trailer landing gear and the trailer wheel assembly.

FIG. 6B shows a cross-section view A-A, in a plane perpendicular to the ground, of the undercarriage of a trailer 30 with the two structures 40a and 40b comprising the device 40. FIG. 6B shows a cross-section view B-B with details of various embodiments of the device 40 comprised of structures 40a and 40b. Concept A shows each structure 40a and 40b of the device 40 may be constructed as an integrated unit 41a and 41b, respectively. Concepts B and C show each structure 40a and 40b of the device 40 may be constructed as individual components with an integrated attachment bracket 42a, 43a, 44a and 42b, 43b, 44b, respectively and a separate horizontal surface 50 and 51. Concepts D and E show each structure 40a and 40b of the device 40 maybe constructed as individual components 45a and 45b with attachment brackets 60a, 61a, 62a and 60b, 61b, 62b, respectively and a separate horizontal surface 50 and 51.

FIG. 7A shows side and bottom views of a tractor trailer ground vehicles 1 with the device 40 installed on the trailer 30 lower surface 37. FIG. 7A shows a single segment version of the device 40 including structures 40a and 40b with swept leading and trailing edges installed between the trailer landing gear and the trailer wheel assembly.

FIG. 7B shows a cross-section view A-A, in a plane perpendicular to the ground, of the undercarriage of a trailer 30 with the two structures 40a and 40b comprising the device 40. FIG. 7B cross-section view B-B shows details of various embodiments of the device 40 including structures 40a and 40b. Edge concept A shows that the lower edge of the outer vertical surface and inner vertical surface of each structure 40a and 40b of the device 40 may be constructed as an integrated unit of the outer and inner vertical surfaces. Edge concept B shows that the lower edge of the outer vertical surface and inner vertical surface of each structure 40a and 40b of the device 40 maybe constructed as dissimilar material from that composing the outer and inner vertical surfaces. Edge concept C shows that the lower edge of the outer vertical surface and inner vertical surface of each structure 40a and 40b of the device 40 may be deflected out of the plane of the outer and inner vertical surfaces.

FIG. 8A show side and bottom views of a tractor trailer ground vehicles 1 with the device 40 installed on the trailer 30 lower surface 37. FIG. 8A shows a single segment version of the device 40 including structures 40a and 40b with swept leading and trailing edges installed between the trailer landing gear and the trailer wheel assembly.

FIG. 8B shows a cross-section view, in a plane perpendicular to the ground, of the undercarriage of a trailer 30 and the two structures 40a and 40b comprising the device 40. The preferred embodiment of the invention is that the device 40 is self-supporting without bracing and bracket. For the preferred embodiment each structure, 40a and 40b, comprising the device 40 contains three primary surfaces; an outer vertical surface, 40aa and 40ba, an inner vertical surface, 40ab and 40bb, and a base surface, 40ac and 40bc, where the base surface extends between the upper most edge of the outer vertical surface and inner vertical surface comprising each structure 40a and 40b. The structures 40a and 40b mechanically attach to the trailer undercarriage by any suitable attachment device, such as clamps, bolts, weld, interlocking pieces, and the like.

FIG. 9A shows side and bottom views of a tractor trailer ground vehicles 1 with the device 40 installed on the trailer 30 lower surface 37. FIG. 9A shows a single segment version of the device 40 including structures 40a and 40b with swept leading and trailing edges installed between the trailer landing gear and the trailer wheel assembly.

FIG. 9B shows a cross-section view, in a plane perpendicular to the ground, of the undercarriage of a trailer 30 and the two structures 40a and 40b comprising the device 40. An alternate embodiment of the invention is that the device 40 employs a minimal sized bracing to provide the necessary rigidity. For this embodiment, each structure, 40a and 40b, comprising the device 40 contains three primary surfaces; an outer vertical surface, 40aa and 40ba, an inner vertical surface, 40ab and 40bb, and a base surface, 40ac and 40bc, where the base surface extends between the upper most edge of the outer vertical surface and inner vertical surface comprising each structure 40a and 40b. Bracing may be applied in the form of an angle bracket 80 that attaches to the inward facing surface of the inner vertical surface 40ab and 40bb and to the trailer undercarriage. Support may be supplied to the outer vertical surface by means of a minimum-diameter support rod or member 70. The structures 40a and 40b mechanically attach to the trailer undercarriage by any suitable attachment device, such as clamps, bolts, weld, interlocking pieces, and the like.

Figure 10A:
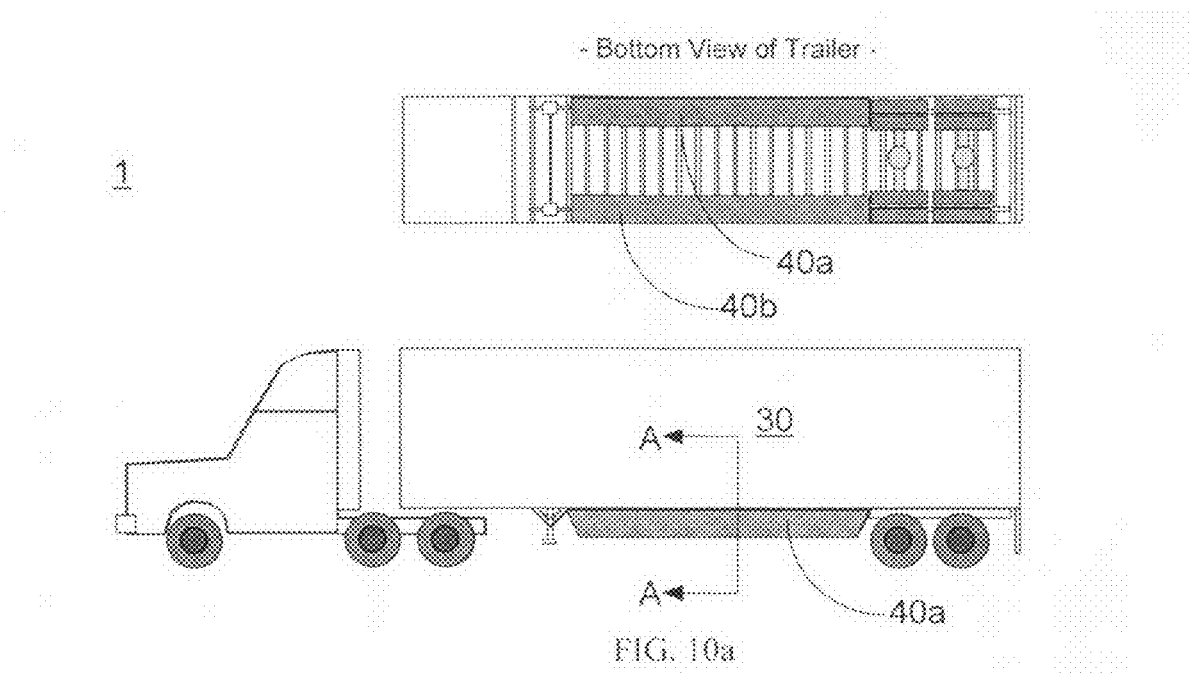
FIGS. 10A-10B is a side view, perspective view, and cross-section view of the invention illustrating an alternate stiffening and mounting concept.

FIG. 10A shows side and bottom views of a tractor trailer ground vehicle 1 with the device 40 installed on the trailer 30 lower surface 37. FIG. 10A shows a single segment version of the device 40 including structures 40a and 40b with swept leading and trailing edges installed between the trailer landing gear and the trailer wheel assembly.

Figure 10B:
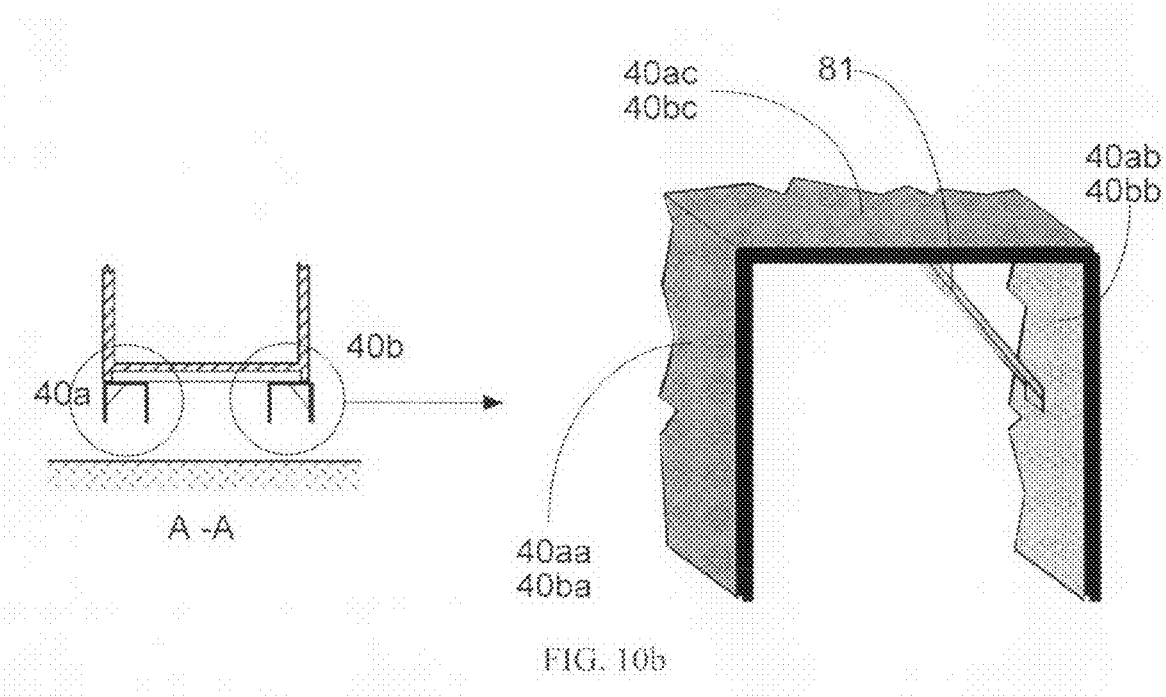

FIG. 10B shows a cross-section view, in a plane perpendicular to the ground, of the undercarriage of a trailer 30 and the two structures 40a and 40b comprising the device 40. A further alternate embodiment of the invention is that the device 40 employs a minimal sized bracing to provide the necessary rigidity to the outer vertical surface 40aa and 40ba. For this embodiment, each structure, 40a and 40b, comprising the device 40 contains three primary surfaces; an outer vertical surface, 40aa and 40ba, an inner vertical surface, 40ab and 40bb, and a base surface, 40ac and 40bc, where the base surface extends between the uppermost edge of the outer vertical surface and inner vertical surface comprising each structure 40a and 40b. Bracing may be applied in the form of minimum-sized angle bracket 81 that attaches to the inward facing surface of the outer vertical surface 40aa and 40ba and to the horizontal surface. The structures 40a and 40b mechanically attach to the trailer undercarriage by any suitable attachment device, such as clamps, bolts, weld, interlocking pieces, and the like.

Figure 11B:
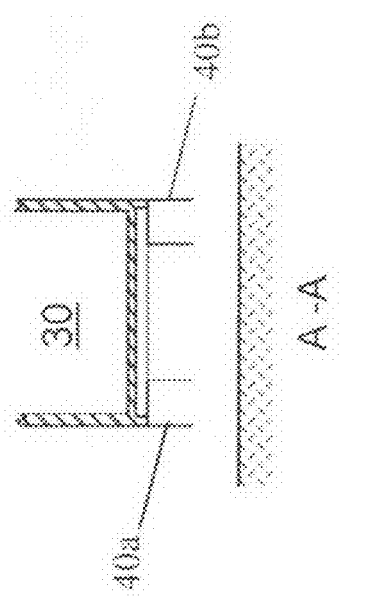
FIG. 11B is a rear view.
Figure 11A:
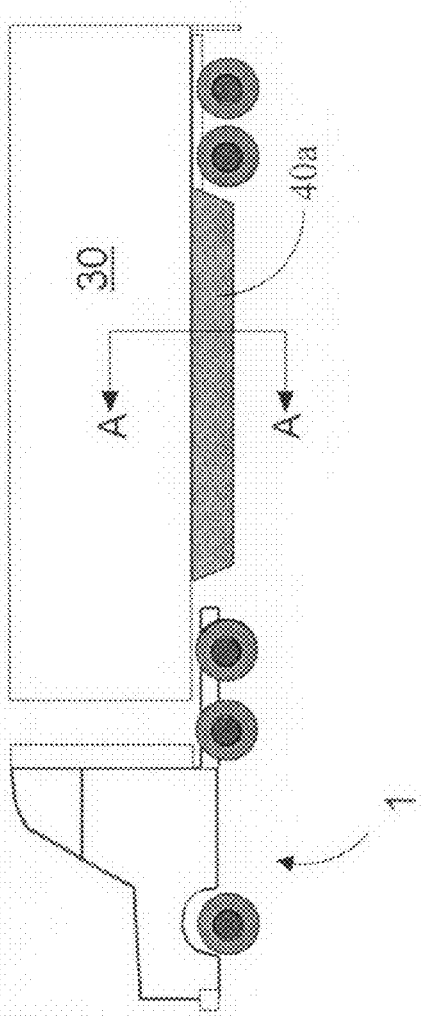
FIG. 11A is a side view.
Figure 11C:
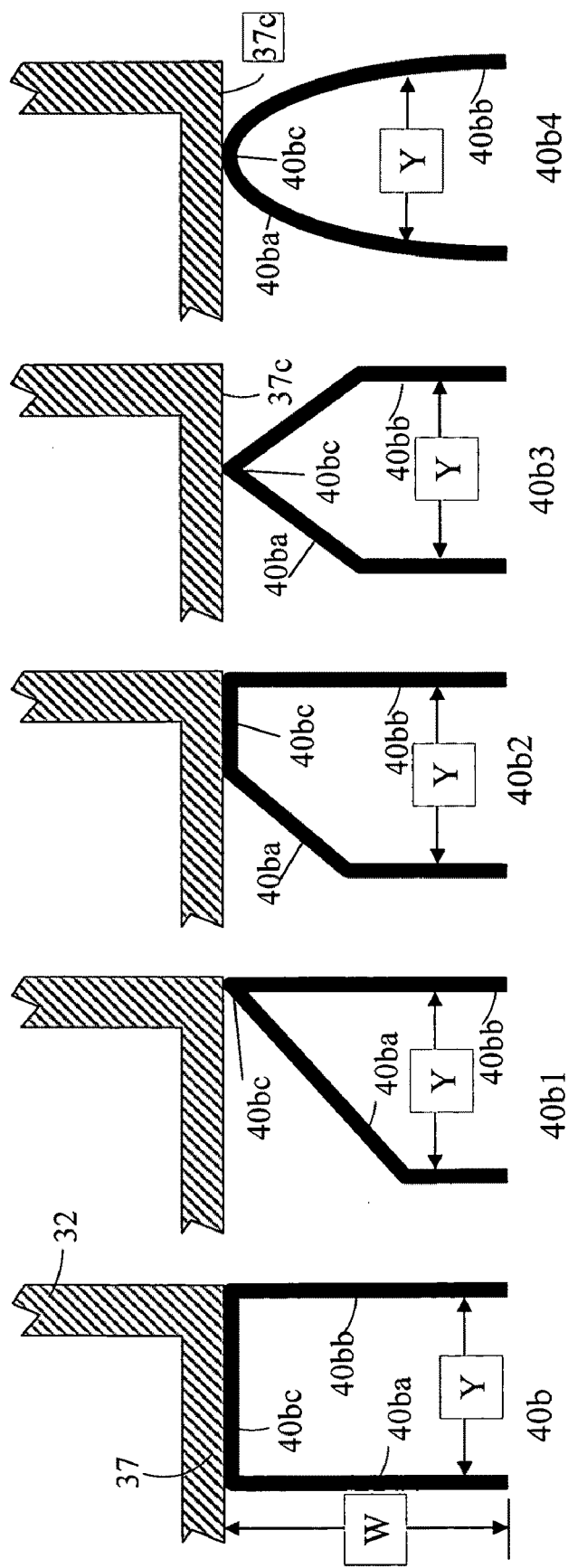
FIG. 11C is a rear view comparison of various embodiments.
Figure 12B:
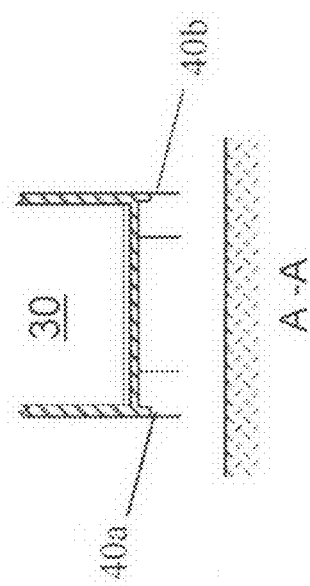
FIG. 12B is a rear view.
Figure 12A:
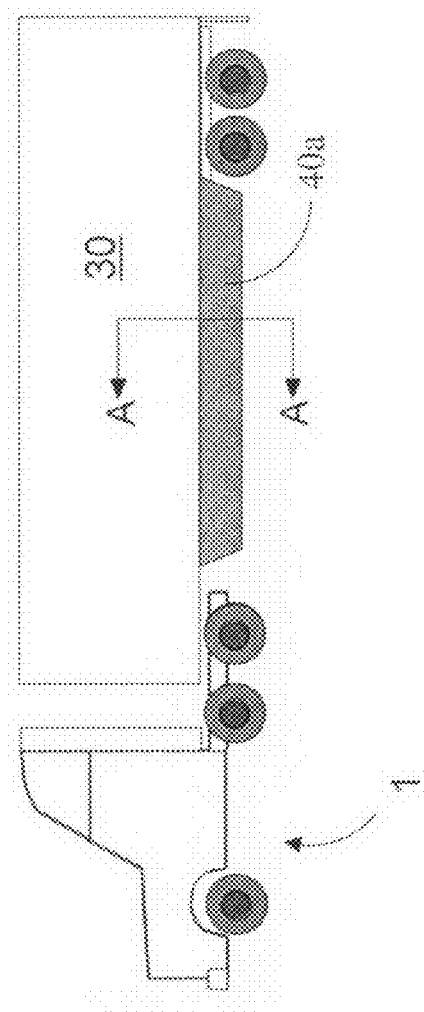
FIG. 12A is a side view.
Figure 12C:
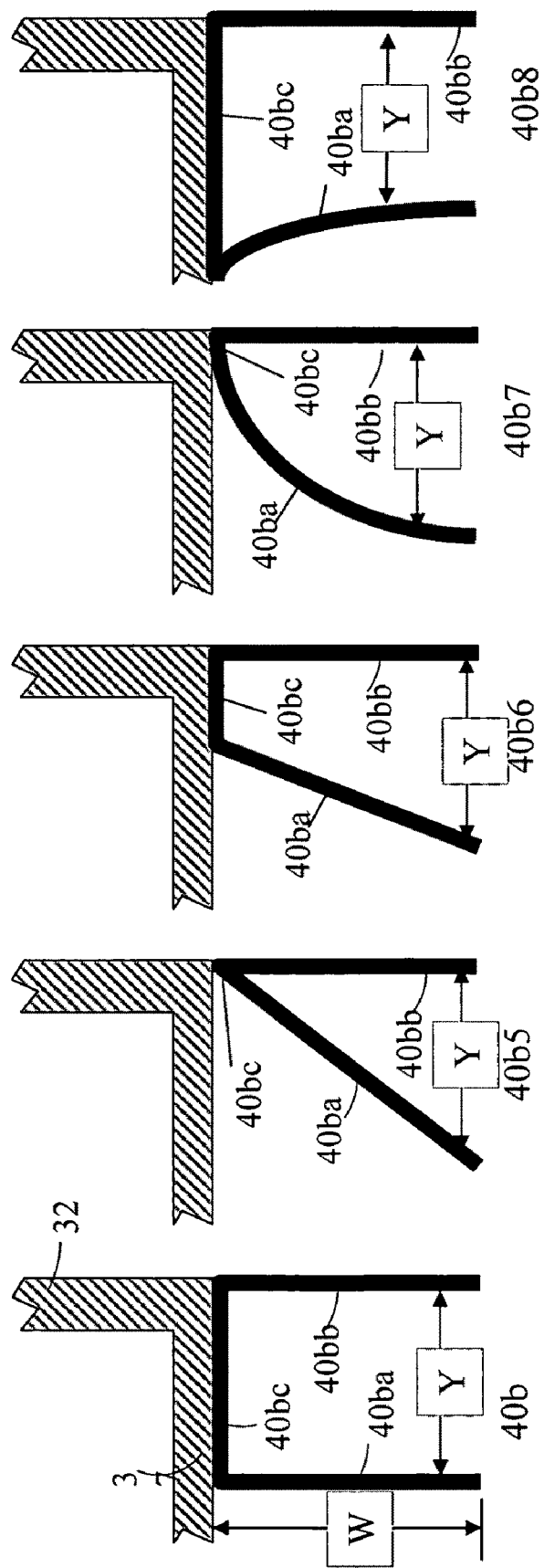
FIG. 12C is a rear view comparison of various embodiments.
Figure 13B:
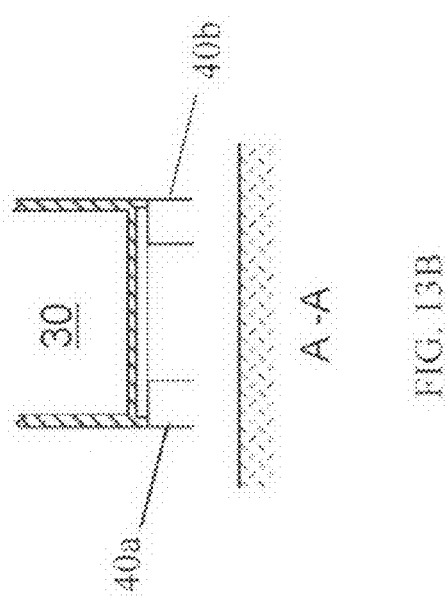
FIG. 13B is a rear view.
Figure 13A:
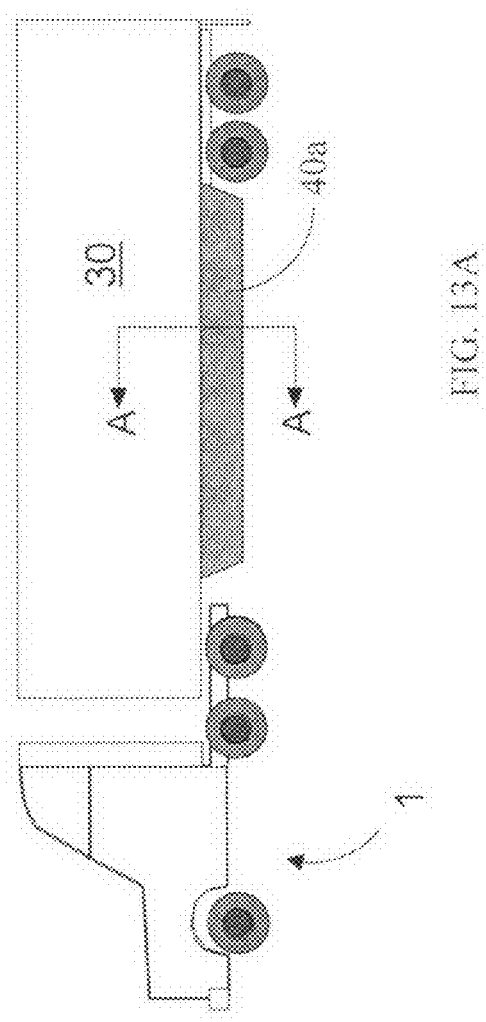
FIG. 13A is a side view.
Figure 13C:
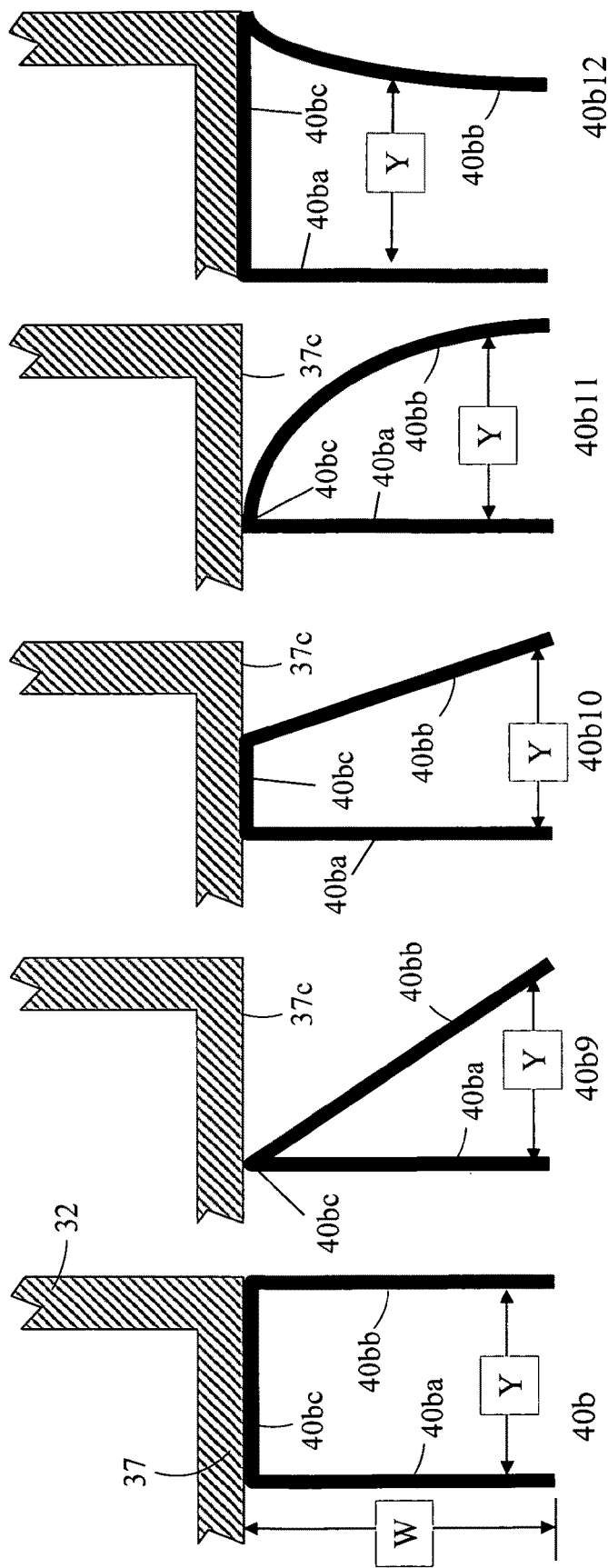
FIG. 13C is a rear view comparison of various embodiments.
Figure 14B:
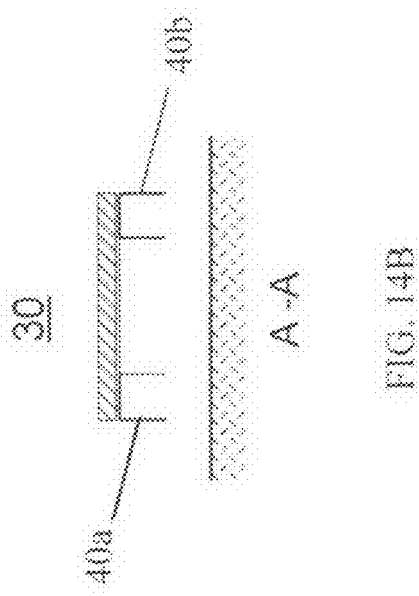
FIG. 14B is a rear view.
Figure 14A:
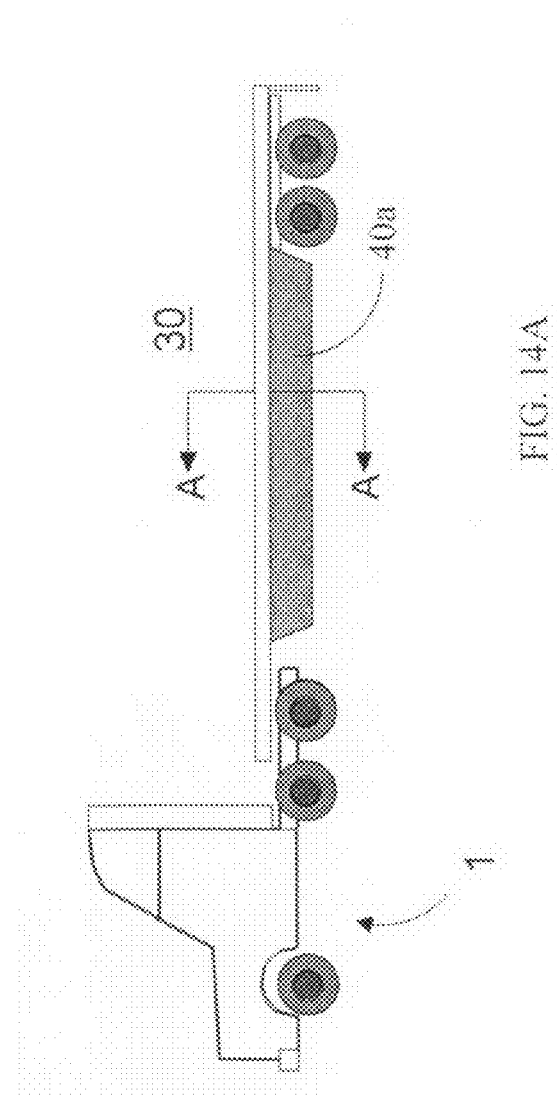
FIG. 14A is a side view of a flat bed application.
Figure 14C:
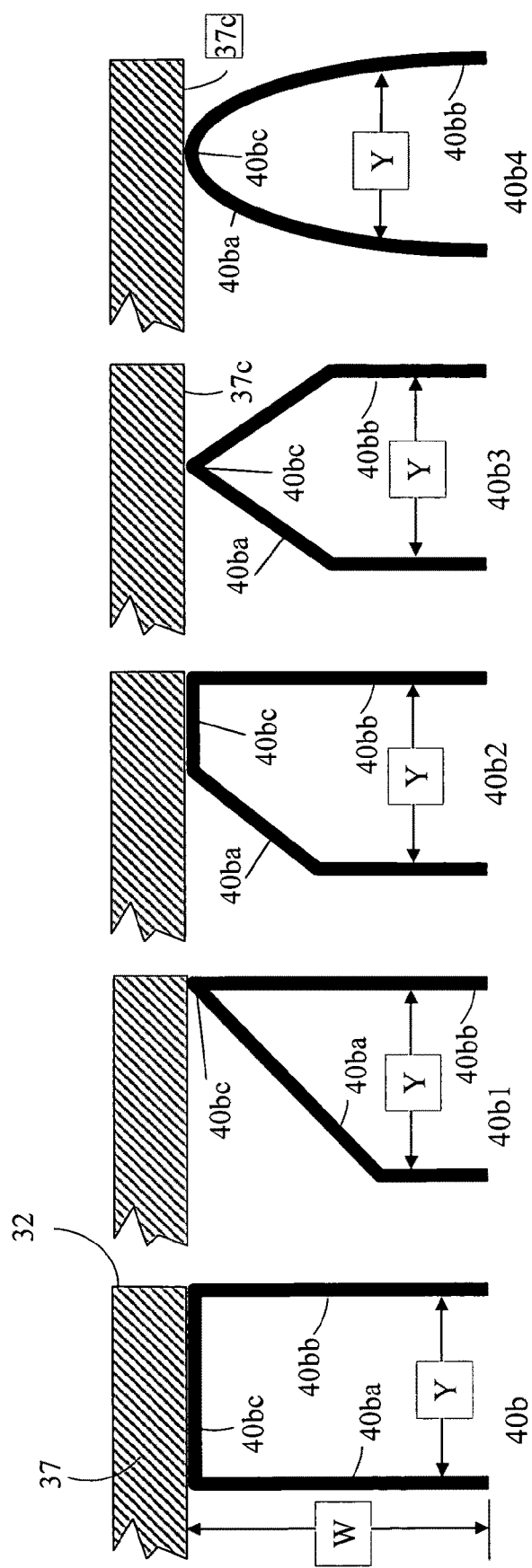
FIG. 14C is a rear view of various embodiments.
Figure 15C:
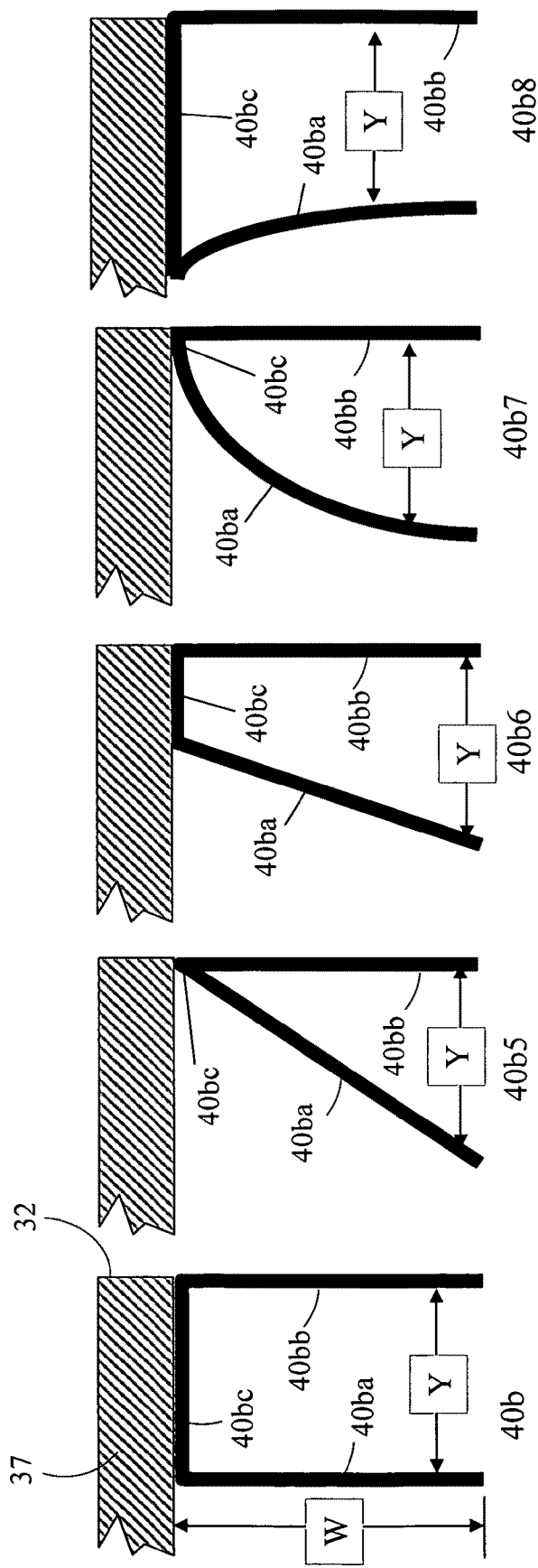
FIG. 15C is a rear view comparison of various embodiments.
Figure 16B:
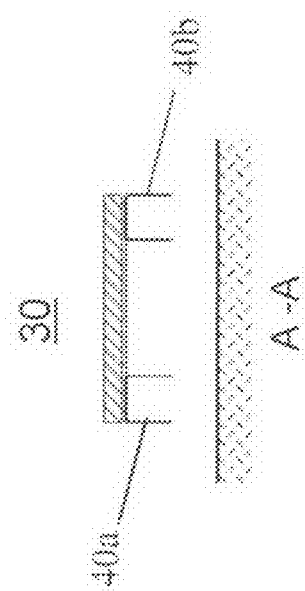
FIG. 16B is a rear view.
Figure 16A:
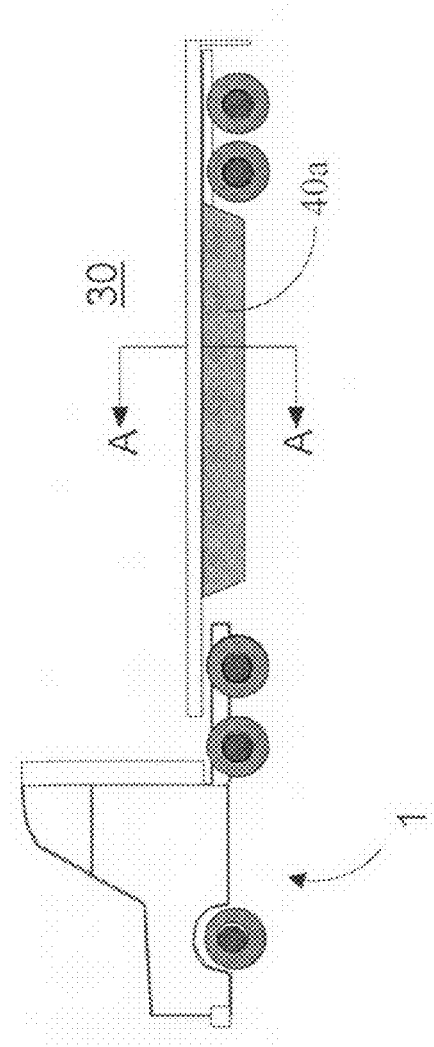
FIG. 16A is a side view of a flat bed application.
Figure 16C:
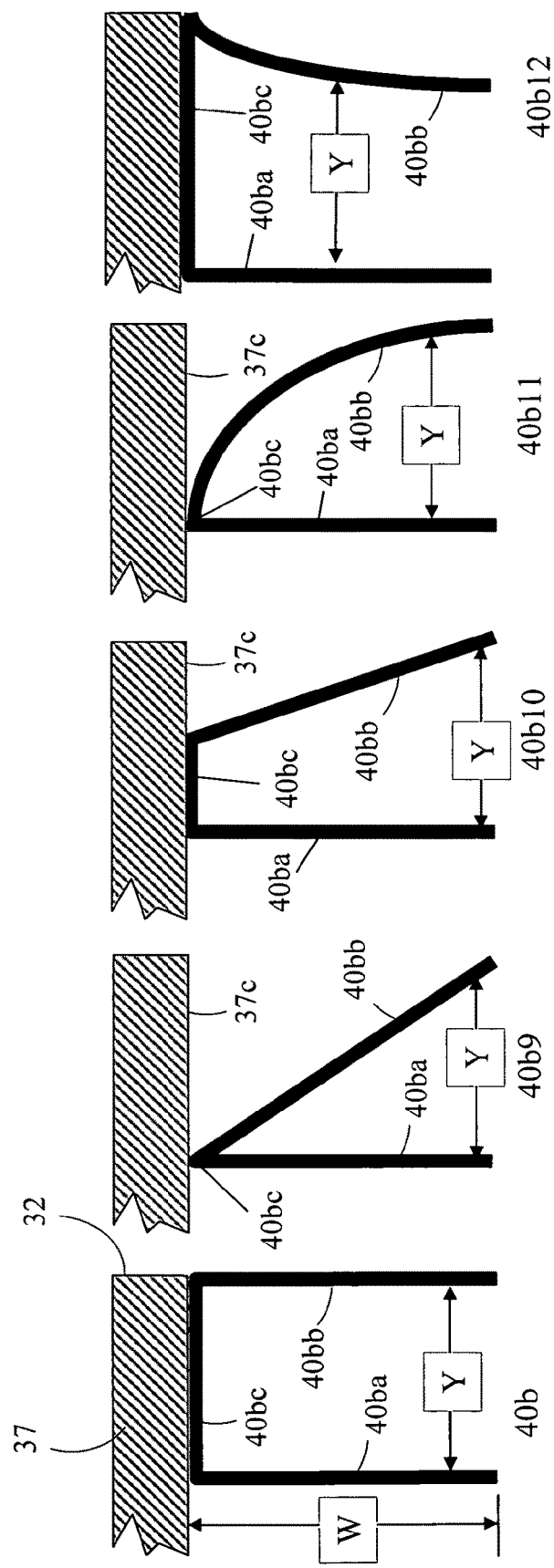
FIG. 16C is a rear view comparison of various embodiments.
Figure 17B:
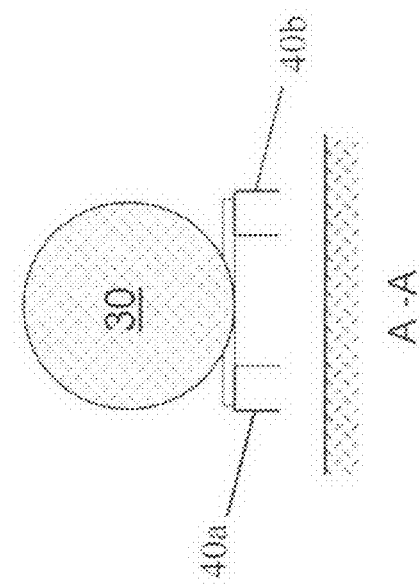
FIG. 17B is a rear view.
Figure 17A:
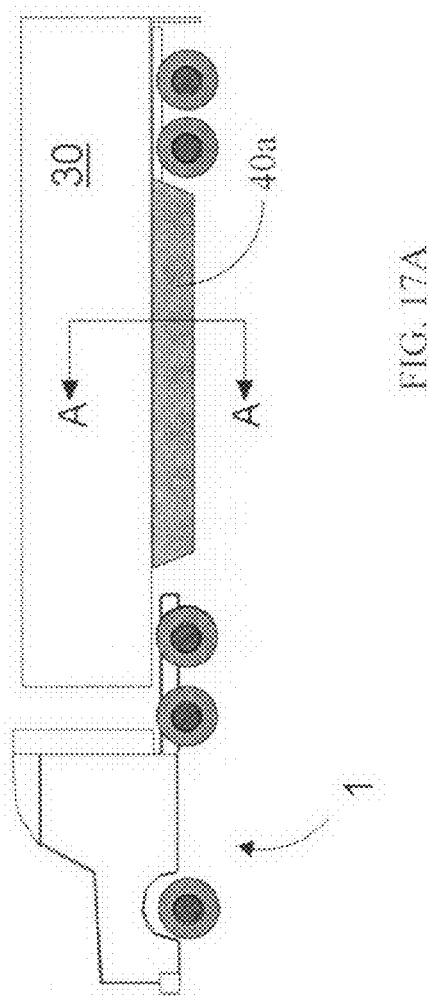
FIG. 17A is a side view of a tanker application.
Figure 17C:
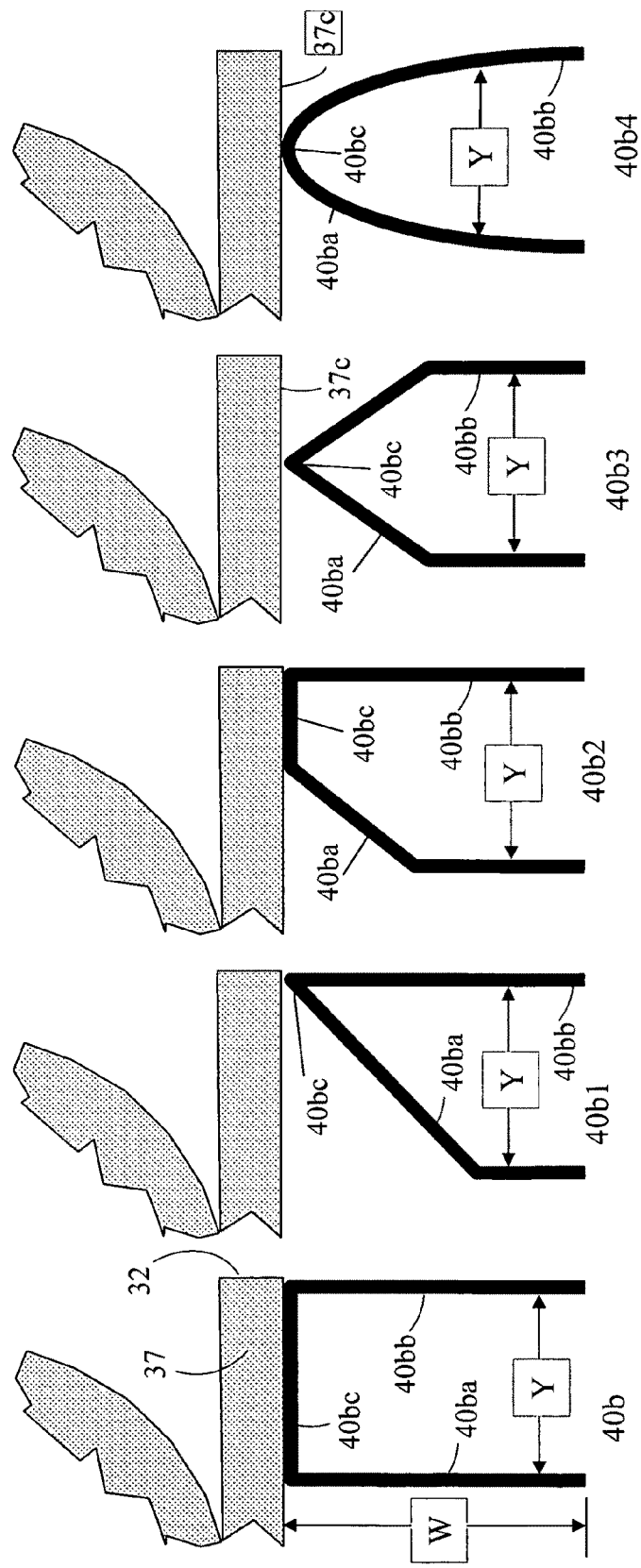
FIG. 17C is a rear view comparison of various embodiments.
Figure 18D:
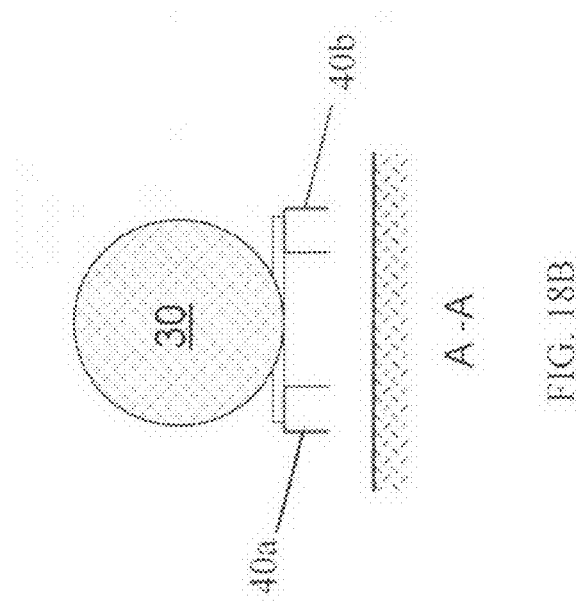
FIG. 18A is a side view of a tanker application.
FIG. 18B is a rear view.
FIG. 18C is a rear view comparison of various embodiments.
Figure 18A:
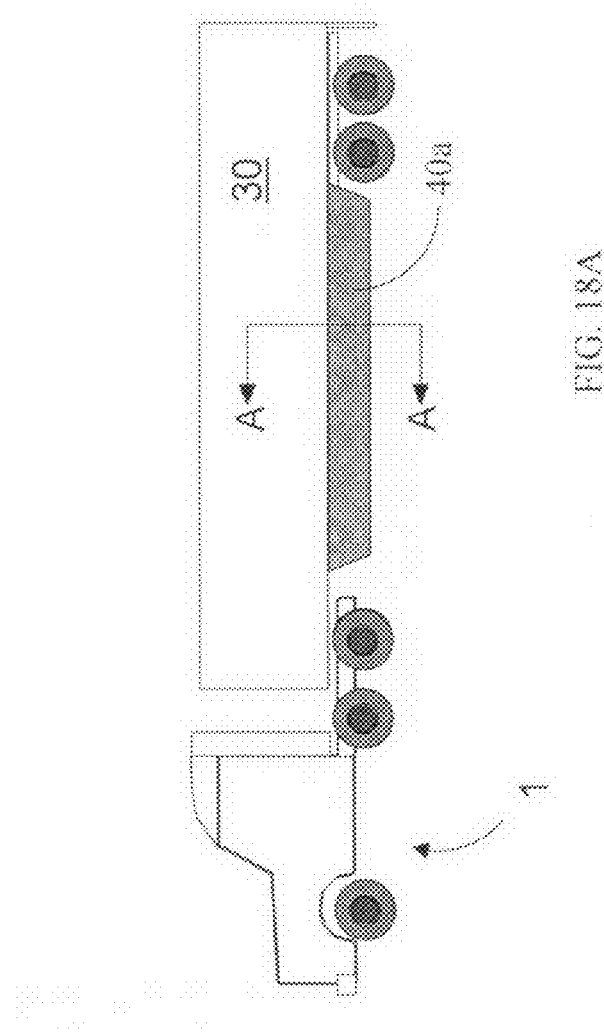
Figure 18C:
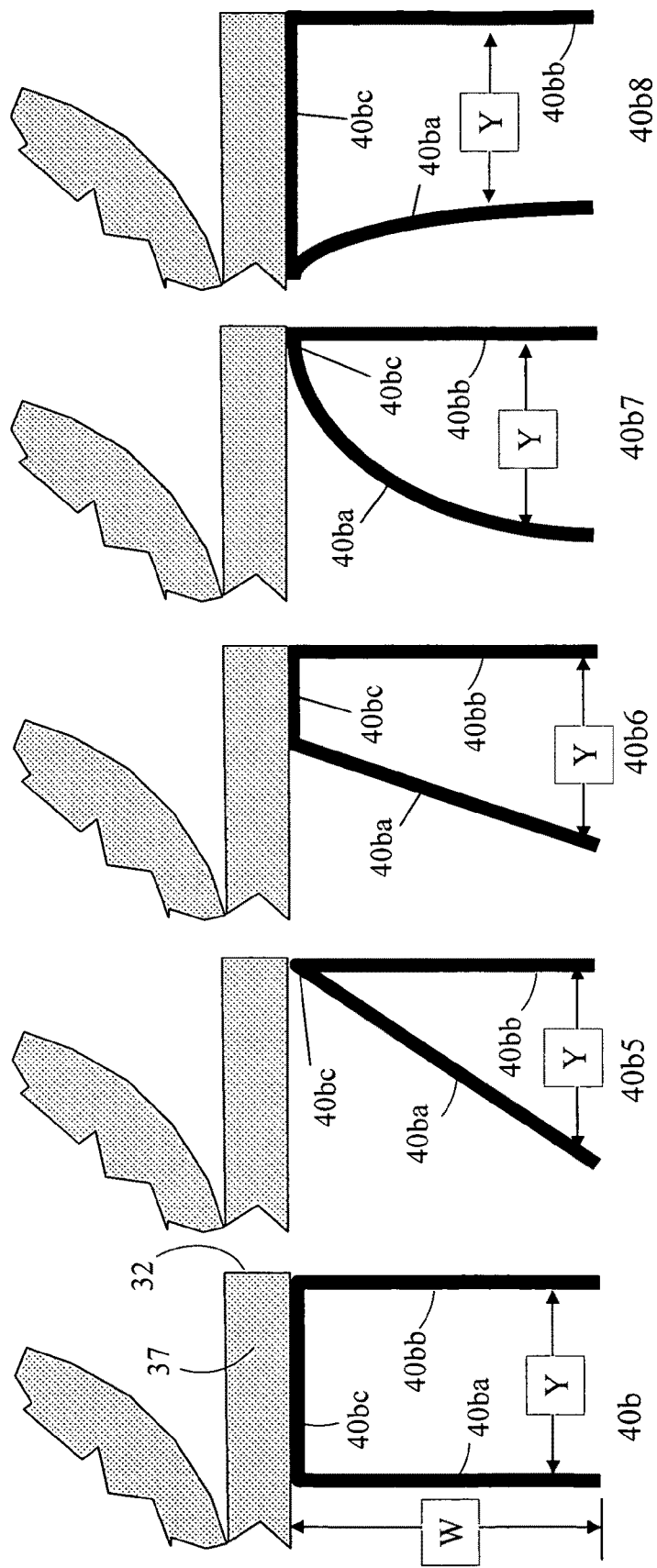
Figure 19B:
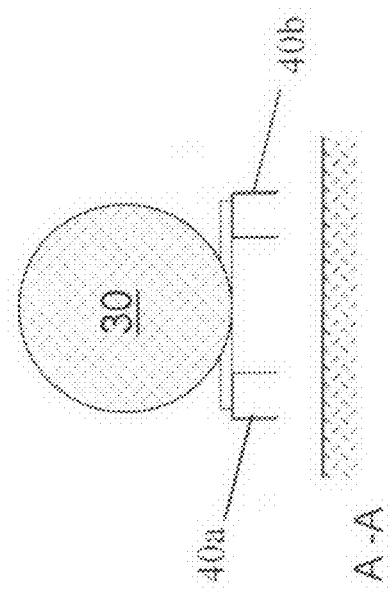
FIG. 19B is a rear view.
Figure 19A:
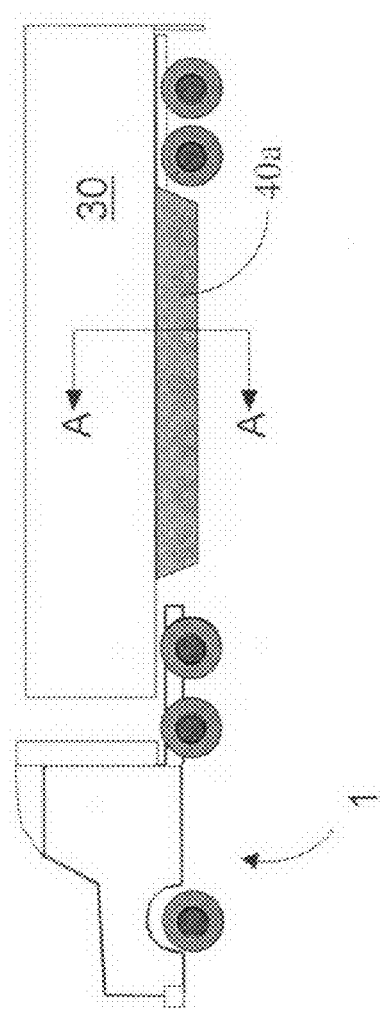
FIG. 19A is a side view of a tanker application.
Figure 19C:
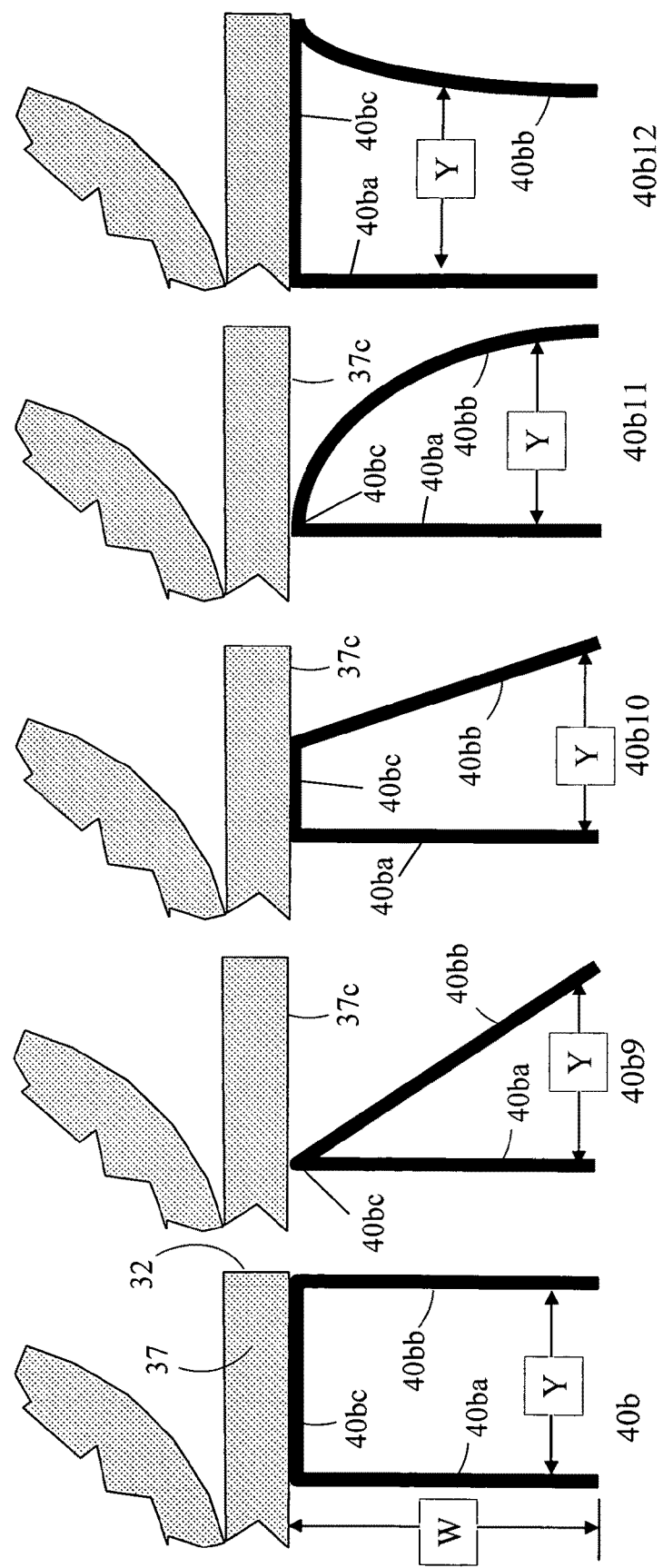
FIG. 19C is a rear view comparison of various embodiments.

FIG. 11A shows a side view of tractor trailer 1 with structure 40a visible. FIG. 11B shows a rear view of tractor trailer 1, along lines A-A in a plane perpendicular to the ground, with structures 40a and 40b visible. FIG. 11C shows a rear view detail of structure 40b from FIGS. 11a-11b, along with alternative embodiments of structure 40b designated structures 40b1-40b4. FIGS. 12 and 13 provide similar illustrations for alternative embodiments of structure 40b with structures 40b5-40b12. FIGS. 14-16 illustrate these alternative embodiments installed with a flat bed tractor trailer 1, while FIGS. 17-19 illustrate these alternative embodiments with a tanker tractor trailer 1. The alternative embodiments illustrated herein for structure 40b may be similarly applied to structure 40a. Thus, references made to the panels of structure 40b in FIGS. 11C-19C are for convenience of illustration, and should be construed as applicable or suitable for the respective panels of companion structure 40a.

These alternative embodiments of device 40 each define different profiles for the inverted U-shaped channels of structures 40a and 40b that open in the downward direction. As noted above, the panels of device 40 are configured to generate a vortex (not shown) within the channel when the ground vehicle or tractor trailer 1 is in motion, wherein the vortex has an axis of rotation aligned with the direction of motion of the ground vehicle. Changing the shape or profile of the U-shaped channel as shown herein may change the boundary of the trapped vortex in minor ways, but does not substantially impair the functional ability of the structures to generate the vortex described above. On the other hand, the shape changes disclosed herein do enable the accommodation of the device 40 to certain operational concerns described below. As may be seen from structures 40b1-40b12, the profile of device 40 may be modified by varying the value of the transverse Y while approaching the lower surface 37, which means creating some incline apart from completely vertical in some portion of one or more of the vertical panels 40ba, 40bb, or both 40ba and 40bb. In general, however, transverse Y at the mouth of the structure is configured (along with panels 40aa, 40ab, 40ac, 40ba, 40bb, and 40bc) in each of these embodiments to form the inverted U-shaped channel for generating a vortex. The phrase "inverted U-shaped channel" is thus intended to be construed so as to include these profile modifications. In some embodiments, as may be seen with structures such as 40b1, 40b3, 40b4, 40b5, 40b7, 40b9, and 40b11, the incline of vertical panels 40ba and 40bb may be so configured as to reduce 40bc to a transverse point of connection to lower surface 37. Thus, for purpose of description, panel 40bc describes the transverse or horizontal, with panels 40ba and 40bb being vertical, whether inclined or completely vertical.

In a first example of an operational consideration, device 40 may be adapted for use with certain trailers used in intermodal systems. Alternative structures 40b3, 40b4, 40b9, 40b10, and 40b11 of FIGS. 11C and 13C provide an inverted U-shaped channel that opens in the downward direction, while exposing a corner 37c of trailer 30. This exposed corner 37c of trailer 30 can be gripped by cranes or other moving equipment (not shown). Such a configuration is particularly well suited for trailers used in "piggy-back" inter-modal system in which wheeled trailers are lifted and placed on railroad flatcars. To accommodate this consideration, the alternative structures may feature a transverse Y that decreases at the vicinity of contact with lower surface 37, creating an incline in 40bb and optionally 40ba, so as to expose a corner 37c of trailer 30. Outer panel 40bb is thus attached to lower surface 37 inboard and proximate to right surface 32. In retrofit embodiments, such modifications may also be useful for the avoidance of pre-existing undercarriage structure (not shown) that may depend from lower surface 37 near right surface 32. Of course, device 40 may be modified similarly in structure 40a with respect to the left surface 33.

Thus, with reference to FIGS. 11C and 13C, alternative structures 40b3, 40b4, and 40b9-40b11, for example, have a pair of rigid panels 40ba, 40bb attached to the right side of the bottom surface of the vehicle 30 and extending downward, including an outer panel 40bb attached inboard and proximate to the right surface 32 of the vehicle and an inner panel 40ba located inboard of the outer panel 40bb. The pair of rigid panels are configured with each panel extending downward from the vehicle 30 a desired vertical distance and having a lower edge that is aerodynamically sharp and wherein the outer panel 40bb is separated from the inner panel 40ba at the lower edges by a second horizontal distance. The pair of rigid panels 40ba, 40bb are configured so as to form an inverted U-shaped channel open to the downward direction, with the panels 40ba, 40bb further configured to generate a vortex within the channel when the ground vehicle 30 is in motion, wherein the vortex has an axis of rotation aligned with the direction of motion of the ground vehicle 30, wherein at least a portion of the outer panel 40bb is inclined outwardly without exceeding the plane of the right surface 32 of the vehicle, and the horizontal distance Y between inner and outer panels 40ba, 40bb proximate to the bottom surface 37 of the vehicle is less than the horizontal or transverse distance Y between the inner and outer panels 40ba, 40bb at the lower edge of the panels. Modified structures for 40a (not shown) could be similarly configured with respect to the left surface 33.

As noted above, alternative structures 40b9-40b11 provide free space on lower surface 37 near corner 37c, which can be useful in retrofitting applications. In some embodiments of device 40b, it may be desirable to reduce the attachment area on lower surface 37 to avoid preexisting undercarriage structure (not shown) depending from lower surface 37 inboard of structure 40b. Alternative structures 40b1-40b7 all provide a smaller point of attachment to lower surface 37 and provides free space to accommodate the presence of preexisting undercarriage structure inboard. Alternative structures 40b3 and 40b4 notably provide free space both inboard and outboard of the structure.

Thus, alternative structures 40b1-40b7 show a pair of rigid panels 40ba, 40bb attached to the right side of the bottom surface 37 of the vehicle 30 and extending downward, including an outer panel 40bb substantially coplanar with the right surface of the vehicle and an inner panel 40ba located inboard of the outer panel 40bb. The pair of rigid panels 40ba, 40bb is configured with each panel extending downward from the vehicle 30 a desired vertical distance and having a lower edge that is aerodynamically sharp and wherein the outer panel 40bb is separated from the inner panel 40ba at the lower edges by a horizontal or transverse distance Y. The rigid panels 40ba, 40bb are configured so as to form an inverted U-shaped channel open to the downward direction, with the panels further configured to generate a vortex within the channel when the ground vehicle 30 is in motion, wherein the vortex has an axis of rotation aligned with the direction of motion of the ground vehicle 30. In this example, at least a portion of inner panel 40ba is inclined inwardly (inboard) as it extends downward so that the horizontal distance between the inner panel 40ba and the outer panel 40bb at the lower edge of the panels is greater than the horizontal distance between them proximate to the bottom surface 37 of the vehicle 30. Modified structures for 40a (not shown) could be similarly configured with respect to the left surface 33.

Such modifications may have additional benefits. Some of the foregoing embodiments of device 40 have a reduced complexity for the inverted U-shaped channel profile, which simplifies manufacture. In addition, a simpler profile generally reduces the amount of material used in manufacture, which also reduces material expense and weight, making it cheaper to use in operation. For example, alternative structures 40b5 and 40b9 may be fabricated from a single piece of material with a single crease, such that base surface 40bc is reduced to a minimum horizontal required for attachment to lower surface 37. In other words, the value of the transverse Y may be reduced as it approaches the lower surface 37, leaving the point of attachment. In addition, some of the simpler embodiments of device 40*b*, such as structures 40*b*3 or 40*b*4, may be desirable for avoiding the buildup of dirt and/or ice within the inverted U-shaped channel during operation.

A number of the alternative structures discussed above provide free space on lower surface 37, either inboard, outboard, or both. In some embodiments of device 40*b*, it may be desirable to reduce the value of the transverse Y without the need for reducing the area of attachment on lower surface 37. This need may arise in avoiding pre-existing undercarriage structure that might otherwise interfere with the panels forming the inverted U-shaped channel, but the attachment of the pre-existing undercarriage structure is located elsewhere on lower surface 37. Alternative structures 40*b*8 and 40*b*12 illustrate two examples enabling additional free space inboard or outboard, as may be desired.

Alternative structure 40*b*8 has a pair of rigid panels 40*ba*, 40*bb* attached to the right side of the bottom surface 37 of the vehicle 30 and extending downward, including an outer panel 40*bb* substantially coplanar with the right surface 33 of the vehicle and an inner panel 40*ba* located inboard of the outer panel 40*bb*. The pair of rigid panels 40*ba*, 40*bb* is configured with each panel extending downward from the vehicle 30 a desired vertical distance and having a lower edge that is aerodynamically sharp and wherein the outer panel 40*bb* is separated from the inner panel 40*ba* at the lower edges by a horizontal distance. The pair of rigid panels 40*ba*, 40*bb* are configured so as to form an inverted U-shaped channel open to the downward direction, with the panels further configured to generate a vortex within the channel when the ground vehicle 30 is in motion, wherein the vortex has an axis of rotation aligned with the direction of motion of the ground vehicle 30. At least a portion of inner panel 40*ba* is inclined outwardly, and wherein the horizontal distance between the inner and outer panels 40*ba*, 40*bb* proximate to the bottom surface 37 of the vehicle 30 is greater than the horizontal distance between the inner and outer panels 40*ba*, 40*bb* at the lower edge of the panels.

Alternative structure 40*b*12 has a pair of rigid panels 40*ba*, 40*bb* attached to the right side of the bottom surface 37 of the vehicle 30 and extending downward, including an outer panel 40*bb* substantially coplanar with the right surface 33 of the vehicle and an inner panel 40*ba* located inboard of the outer panel 40*bb*. The pair of rigid panels 40*ba*, 40*bb* is configured with each panel extending downward from the vehicle 30 a desired vertical distance and having a lower edge that is aerodynamically sharp and wherein the outer panel 40*bb* is separated from the inner panel 40*ba* at the lower edges by a horizontal distance. The pair of rigid panels 40*ba*, 40*bb* are configured so as to form an inverted U-shaped channel open to the downward direction, with the panels further configured to generate a vortex within the channel when the ground vehicle 30 is in motion, wherein the vortex has an axis of rotation aligned with the direction of motion of the ground vehicle 30. At least a portion of outer panel 40*bb* is inclined inwardly but substantially proximate to the plane of the right surface 37 of the vehicle 30, and wherein the horizontal distance between the inner and outer panels 40*ba*, 40*bb* proximate to the bottom surface 37 of the vehicle 30 is greater than the horizontal distance between the inner and outer panels 40*ba*, 40*bb* at the lower edge of the panels.

These alternate embodiments may incorporate a number of structural variations. For example, the aerodynamic device may include one or more of the panels on the left or right side of the vehicle that are comprised of multiple longitudinal segments. In one embodiment, each panel may extend downward from the vehicle a distance of less than about 90% of the distance from the bottom surface of the vehicle to the surface that the vehicle is moving over. Each panel of at least one of the first pair or second pair may extend downward a substantially equal distance from the bottom surface of the vehicle. In another example, at least one panel may extend downward a distance that varies along its length. An embodiment may include at least one of the first or second pairs of panels being integrally connected to each other by a horizontal panel. This horizontal panel located between the outer and inner panels may be separate from the pair of panels. At least one of the first or second pairs of panels may be an integral extension of the side surface of the vehicle. In another example, at least one panel has a swept leading edge. Optionally, the panels may be folded so as to be substantially adjacent and proximate the bottom surface of the vehicle when not in use. Also, at least one of the first or second pairs of panels may be slidably connected to the vehicle such that the panels slide longitudinally along the vehicle. In some cases, the distance between at least one of the first or second pairs of panels may be adjustable.

While the invention has been described and illustrated using two pairs or panels on the bottom surface of the vehicle, those of skill in the art will understand that the invention is not so limited. For example, a third or more panels may be included in each panel grouping on the bottom surface of the vehicle. It is believed that such additional panels would further enhance the aerodynamic drag reduction of the device.

From the description provided above, a number of features of the mini-skirt aerodynamic fairing become evident:

The invention provides a process to reduce the drag of a ground vehicle.

(a) The invention uses vortices to generate upwash to reduce undercarriage flow and reduce drag.

(b) The invention reduces the aerodynamic drag and improves the operational efficiency of bluff-base vehicles.

(c) The invention reduces the aerodynamic drag and improves the fuel efficiency of bluff-base vehicles.

(d) The invention conserves energy and improves the operational efficiency of bluff-base vehicles.

(e) The invention reduces the aerodynamic drag without a significant geometric modification to existing ground vehicles.

(f) The invention may be easily applied to any existing ground vehicle or designed into any new ground vehicle.

(g) The invention may be efficiently operated with a limited number of components.

(h) The invention permits the matching of complex surface shapes by the shaping and placement of the components.

(i) Large reductions in drag force may be achieved with a large vertical spacing between the lower edge of the invention and the road surface.

(j) The structure, placement, and shape of each component may be adapted to meet specific performance or vehicle integration requirements.

(k) The leading edge shape of each surface may be linear or complex to meet specific performance or vehicle integration requirements.

(l) The lower edge shape of each surface may be linear or complex to meet specific performance or vehicle integration requirements.

(m) The trailing edge shape of each surface may be linear or complex to meet specific performance or vehicle integration requirements.

(n) Each component of the device may be optimally positioned on the vehicle undercarriage.

(o) The device minimizes weight and volume requirements within the vehicle.

(p) The device has minimal maintenance requirements.

(q) The device has minimal impact on operational and use characteristics of the vehicle door system.

(r) The device provides for maximum safety of vehicle operation.

Accordingly, the reader will see that the mini-skirt aerodynamic fairing device can be used to easily and conveniently reduce aerodynamic drag on any ground vehicle for the purposes of improving the operational performance of the vehicle. For example, ground vehicles may include busses, rail cars, automobiles, etc., so long as such vehicle would benefit from the present invention's implementation of the three flow control concepts of vortex generation, upwash management, and ground effect interference.

Although the description above contains many specificities, these should not be construed as limiting the scope of the invention but as merely providing illustrations of some of the presently preferred embodiments of this invention. For example, the outer and inner vertical surfaces can be composed of various planar shapes such as ellipsoid, quadratic, and the like; the outer and inner vertical surfaces can be rotated from the vertical axis or may be curvilinear surfaces that are parallel with the axis of the vehicle; the thickness and width can vary along the length; the material can be any light-weight and structurally sound material such as wood, plastic, metal, composites, and the like; the substrate can be any metal, wood, plastic, composite, rubber, ceramic, and the like; the application surface can be that of a metal, wood, plastic, composite, rubber, ceramic, and the like. The attachment and actuation hardware can be either conventional off the shelf or designed specifically for the subject invention. Further, the present invention may be incorporated or integrated within the structure of the vehicle, so as to require no separate attachment.

The invention has been described relative to specific embodiments thereof and relative to specific vehicles, it is not so limited. The invention is considered applicable to any road vehicle including race cars automobiles, trucks, buses, trains, recreational vehicles and campers. The invention is also considered applicable to non-road vehicles such as hovercraft, watercraft, aircraft and components of these vehicles. It is to be understood that various modifications and variation of the specific embodiments described herein will be readily apparent to those skilled in the art in light of the above teachings without departing from the spirit and scope.

Thus, the scope of the invention should be determined by the appended claims and their legal equivalents, rather than by the examples given.

What is claimed is:

1. An aerodynamic device for reducing drag on a ground vehicle, comprising:
a first pair of rigid panels attached to the left side of the bottom surface of the vehicle and extending downward from the vehicle, including an outer panel substantially coplanar with the left surface of the vehicle and an inner panel located inboard of the outer panel, wherein the first pair of rigid panels is configured with each panel extending downward from the vehicle a desired first vertical distance and having a lower edge that is aerodynamically sharp and wherein the outer panel is separated from the inner panel at the lower edges by a first horizontal distance;
a second pair of rigid panels attached to the right side of the bottom surface of the vehicle and extending downward from the vehicle, including an outer panel substantially coplanar with the right surface of the vehicle and an inner panel located inboard of the outer panel, wherein the second pair of rigid panels is configured with each panel extending downward from the vehicle a desired second vertical distance and having a lower edge that is aerodynamically sharp and wherein the outer panel is separated from the inner panel at the lower edges by a second horizontal distance; and
wherein the first and second pairs of rigid panels are configured so as to form a first and second inverted U-shaped channel open to the downward direction, with the panels configured to generate a vortex within the channel when the ground vehicle is in motion, wherein the vortex has an axis of rotation aligned with the direction of motion of the ground vehicle, and wherein at least a portion of at least one inner panel is inclined inwardly as it extends downward so that the horizontal distance between the inner and outer panels at the lower edge of the panels is greater than the horizontal distance between the inner and outer panels proximate to the bottom surface of the vehicle.

2. The aerodynamic device of claim 1, wherein one or more of the panels on the left or right side of the vehicle is comprised of multiple longitudinal segments.

3. The aerodynamic device of claim 1, wherein each panel extends downward from the vehicle a distance of less than about 90% of the distance from the bottom surface of the vehicle to the surface that the vehicle is moving over.

4. The aerodynamic device of claim 1, wherein each panel of at least one of the first pair or second pair extends downward a substantially equal distance from the bottom surface of the vehicle.

5. The aerodynamic device of claim 1, wherein at least one panel extends downward a distance that varies along its length.

6. The aerodynamic device of claim 1, wherein at least one of the first or second pairs of panels are integrally connected to each other by a horizontal panel.

7. The aerodynamic device of claim 1, wherein at least one of the first or second pairs of panels is an integral extension of the side surface of the vehicle.

8. The aerodynamic device of claim 1, wherein at least one of the first or second pairs of panels further comprises a horizontal panel located between the outer and inner panels that is separate from the pair of panels.

9. The aerodynamic device of claim 1, wherein at least one panel has a swept leading edge.

10. The aerodynamic device of claim 1, wherein at least one of the first or second pairs of panels is connected to the vehicle such that the panels may be folded so as to be substantially adjacent and proximate the bottom surface of the vehicle when not in use.

11. The aerodynamic device of claim 1, wherein at least one of the first or second pairs of panels is slidably connected to the vehicle such that the panels slide longitudinally along the vehicle.

12. The aerodynamic device of claim 1, wherein the distance between at least one of the first or second pairs of panels is adjustable.

13. An aerodynamic device for reducing drag on a ground vehicle, comprising:
a first pair of rigid panels attached to the left side of the bottom surface of the vehicle and extending downward from the vehicle, including an outer panel attached inboard and proximate to the left surface of the vehicle and an inner panel located inboard of the outer panel, wherein the first pair of rigid panels is configured with each panel extending downward from the vehicle a desired first vertical distance and having a lower edge that is aerodynamically sharp and wherein the outer panel is separated from the inner panel at the lower edges by a first horizontal distance;

a second pair of rigid panels attached to the right side of the bottom surface of the vehicle and extending downward from the vehicle, including an outer panel attached inboard and proximate to the right surface of the vehicle and an inner panel located inboard of the outer panel, wherein the second pair of rigid panels is configured with each panel extending downward from the vehicle a desired second vertical distance and having a lower edge that is aerodynamically sharp and wherein the outer panel is separated from the inner panel at the lower edges by a second horizontal distance; and wherein the first and second pairs of rigid panels are configured so as to form a first and second inverted U-shaped channel open to the downward direction, with the panels configured to generate a vortex within the channel when the ground vehicle is in motion, wherein the vortex has an axis of rotation aligned with the direction of motion of the ground vehicle, wherein at least a portion of the first and second outer panels are inclined outwardly without exceeding the plane of the left or right surfaces of the vehicle, respectively, and the horizontal distance between the inner and outer panels proximate to the bottom surface of the vehicle is less than the horizontal distance between the inner and outer panels at the lower edge of the panels.

14. The aerodynamic device of claim 13, wherein one or more of the panels on the left or right side of the vehicle is comprised of multiple longitudinal segments.

15. The aerodynamic device of claim 13, wherein each panel extends downward from the vehicle a distance of less than about 90% of the distance from the bottom surface of the vehicle to the surface that the vehicle is moving over.

16. The aerodynamic device of claim 13, wherein each panel of at least one of the first pair or second pair extends downward a substantially equal distance from the bottom surface of the vehicle.

17. The aerodynamic device of claim 13, wherein at least one panel extends downward a distance that varies along its length.

18. The aerodynamic device of claim 13, wherein at least one of the first or second pairs of panels are integrally connected to each other by a horizontal panel.

19. The aerodynamic device of claim 13, wherein at least one of the first or second pairs of panels is an integral extension of the side surface of the vehicle.

20. The aerodynamic device of claim 13, wherein at least one of the first or second pairs of panels further comprises a horizontal panel located between the outer and inner panels that is separate from the pair of panels.

21. The aerodynamic device of claim 13, wherein at least one panel has a swept leading edge.

22. The aerodynamic device of claim 13, wherein at least one of the first or second pairs of panels is connected to the vehicle such that the panels may be folded so as to be substantially adjacent and proximate the bottom surface of the vehicle when not in use.

23. The aerodynamic device of claim 13, wherein at least one of the first or second pairs of panels is slidably connected to the vehicle such that the panels slide longitudinally along the vehicle.

24. The aerodynamic device of claim 13, wherein the distance between at least one of the first or second pairs of panels is adjustable.

25. An aerodynamic device for reducing drag on a ground vehicle, comprising:

a first pair of rigid panels attached to the left side of the bottom surface of the vehicle and extending downward from the vehicle, including an outer panel substantially coplanar with the left surface of the vehicle and an inner panel located inboard of the outer panel, wherein the first pair of rigid panels is configured with each panel extending downward from the vehicle a desired first vertical distance and having a lower edge that is aerodynamically sharp and wherein the outer panel is separated from the inner panel at the lower edges by a first horizontal distance;

a second pair of rigid panels attached to the right side of the bottom surface of the vehicle and extending downward from the vehicle, including an outer panel substantially coplanar with the right surface of the vehicle and an inner panel located inboard of the outer panel, wherein the second pair of rigid panels is configured with each panel extending downward from the vehicle a desired second vertical distance and having a lower edge that is aerodynamically sharp and wherein the outer panel is separated from the inner panel at the lower edges by a second horizontal distance; and wherein the first and second pairs of rigid panels are configured so as to form a first and second inverted U-shaped channel open to the downward direction, with the panels configured to generate a vortex within the channel when the ground vehicle is in motion, wherein the vortex has an axis of rotation aligned with the direction of motion of the ground vehicle, wherein at least a portion of the first and second inner panels are inclined outwardly, and wherein the horizontal distance between the inner and outer panels proximate to the bottom surface of the vehicle is greater than the horizontal distance between the inner and outer panels at the lower edge of the panels.

26. The aerodynamic device of claim 25, wherein one or more of the panels on the left or right side of the vehicle is comprised of multiple longitudinal segments.

27. The aerodynamic device of claim 25, wherein each panel extends downward from the vehicle a distance of less than about 90% of the distance from the bottom surface of the vehicle to the surface that the vehicle is moving over.

28. The aerodynamic device of claim 25, wherein each panel of at least one of the first pair or second pair extends downward a substantially equal distance from the bottom surface of the vehicle.

29. The aerodynamic device of claim 25, wherein at least one panel extends downward a distance that varies along its length.

30. The aerodynamic device of claim 25, wherein at least one of the first or second pairs of panels are integrally connected to each other by a horizontal panel.

31. The aerodynamic device of claim 25, wherein at least one of the first or second pairs of panels is an integral extension of the side surface of the vehicle.

32. The aerodynamic device of claim 25, wherein at least one of the first or second pairs of panels further comprises a horizontal panel located between the outer and inner panels that is separate from the pair of panels.

33. The aerodynamic device of claim 25, wherein at least one panel has a swept leading edge.

34. The aerodynamic device of claim 25, wherein at least one of the first or second pairs of panels is connected to the vehicle such that the panels may be folded so as to be substantially adjacent and proximate the bottom surface of the vehicle when not in use.

35. The aerodynamic device of claim 25, wherein at least one of the first or second pairs of panels is slidably connected to the vehicle such that the panels slide longitudinally along the vehicle.

36. The aerodynamic device of claim 25, wherein the distance between at least one of the first or second pairs of panels is adjustable.

37. An aerodynamic device for reducing drag on a ground vehicle, comprising:
   a first pair of rigid panels attached to the left side of the bottom surface of the vehicle and extending downward from the vehicle, including an outer panel attached proximate to the left surface of the vehicle and an inner panel located inboard of the outer panel, wherein the first pair of rigid panels is configured with each panel extending downward from the vehicle a desired first vertical distance and having a lower edge that is aerodynamically sharp and wherein the outer panel is separated from the inner panel at the lower edges by a first horizontal distance;
   a second pair of rigid panels attached to the right side of the bottom surface of the vehicle and extending downward from the vehicle, including an outer panel attached proximate to the right surface of the vehicle and an inner panel located inboard of the outer panel, wherein the second pair of rigid panels is configured with each panel extending downward from the vehicle a desired second vertical distance and having a lower edge that is aerodynamically sharp and wherein the outer panel is separated from the inner panel at the lower edges by a second horizontal distance; and
   wherein the first and second pairs of rigid panels are configured so as to form a first and second inverted U-shaped channel open to the downward direction, with the panels configured to generate a vortex within the channel when the ground vehicle is in motion, wherein the vortex has an axis of rotation aligned with the direction of motion of the ground vehicle, wherein at least a portion of the first and second outer panels are inclined inwardly but substantially proximate to the plane of the left or right surfaces of the vehicle, respectively, and wherein the horizontal distance between the inner and outer panels proximate to the bottom surface of the vehicle is greater than the horizontal distance between the inner and outer panels at the lower edge of the panels.

38. The aerodynamic device of claim 37, wherein one or more of the panels on the left or right side of the vehicle is comprised of multiple longitudinal segments.

39. The aerodynamic device of claim 37, wherein each panel extends downward from the vehicle a distance of less than about 90% of the distance from the bottom surface of the vehicle to the surface that the vehicle is moving over.

40. The aerodynamic device of claim 37, wherein each panel of at least one of the first pair or second pair extends downward a substantially equal distance from the bottom surface of the vehicle.

41. The aerodynamic device of claim 37, wherein at least one panel extends downward a distance that varies along its length.

42. The aerodynamic device of claim 37, wherein at least one of the first or second pairs of panels are integrally connected to each other by a horizontal panel.

43. The aerodynamic device of claim 37, wherein at least one of the first or second pairs of panels is an integral extension of the side surface of the vehicle.

44. The aerodynamic device of claim 37, wherein at least one of the first or second pairs of panels further comprises a horizontal panel located between the outer and inner panels that is separate from the pair of panels.

45. The aerodynamic device of claim 37, wherein at least one panel has a swept leading edge.

46. The aerodynamic device of claim 37, wherein at least one of the first or second pairs of panels is connected to the vehicle such that the panels may be folded so as to be substantially adjacent and proximate the bottom surface of the vehicle when not in use.

47. The aerodynamic device of claim 37, wherein at least one of the first or second pairs of panels is slidably connected to the vehicle such that the panels slide longitudinally along the vehicle.

48. The aerodynamic device of claim 37, wherein the distance between at least one of the first or second pairs of panels is adjustable.

* * * * *